US010686542B2

United States Patent
Kim et al.

(10) Patent No.: US 10,686,542 B2
(45) Date of Patent: *Jun. 16, 2020

(54) METHOD FOR REPORTING CHANNEL STATE INFORMATION ON TRANSMISSION OPPORTUNITY DURATION IN WIRELESS ACCESS SYSTEM SUPPORTING NON-LICENSED BAND, AND DEVICE SUPPORTING SAME

(71) Applicant: LG ELECTRONICS INC., Seoul (KR)

(72) Inventors: Seonwook Kim, Seoul (KR); Seungmin Lee, Seoul (KR); Kijun Kim, Seoul (KR); Hanbyul Seo, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,331

(22) Filed: Oct. 15, 2018

(65) Prior Publication Data

US 2019/0052382 A1 Feb. 14, 2019

Related U.S. Application Data

(63) Continuation of application No. 15/307,704, filed as application No. PCT/KR2015/004320 on Apr. 29, 2015, now Pat. No. 10,122,480.

(Continued)

(51) Int. Cl.
*H04B 17/345* (2015.01)
*H04W 24/10* (2009.01)
(Continued)

(52) U.S. Cl.
CPC ........... *H04B 17/345* (2015.01); *H04L 5/00* (2013.01); *H04L 5/001* (2013.01); *H04L 5/0048* (2013.01);
(Continued)

(58) Field of Classification Search
CPC . H04W 24/10; H04W 24/16; H04W 72/1289; H04B 17/345
See application file for complete search history.

(56) References Cited

U.S. PATENT DOCUMENTS 9,119,154 B2 8/2015 Etemad et al.
9,300,451 B2 * 3/2016 Papasakellariou ... H04B 7/2656
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)," 3GPP TS 36.213 V11.1.0, Dec. 20, 2012, pp. 1-160.

*Primary Examiner* — Rasheed Gidado
(74) *Attorney, Agent, or Firm* — Birch, Stewart, Kolasch & Birch, LLP

(57) ABSTRACT

A method for transmitting channel state information (CSI) on a transmission opportunity (TxOP) duration by a user equipment (UE) in a wireless communication system supporting a unlicensed band, includes measuring CSI of the TxOP duration based on CSI interference measurement (CSI-IM) and/or CSI reference signal (CSI-RS) in one or more time intervals via the unlicensed band, wherein the one or more time intervals are determined based on a starting point of the TxOP duration; and transmitting the CSI to a base station.

15 Claims, 18 Drawing Sheets

Related U.S. Application Data

(60) Provisional application No. 61/986,087, filed on Apr. 29, 2014.

(51) Int. Cl.
*H04W 72/12* (2009.01)
*H04L 5/00* (2006.01)
H04W 76/15 (2018.01)
H04W 16/14 (2009.01)

(52) U.S. Cl.
CPC .......... *H04L 5/0073* (2013.01); *H04L 5/0094* (2013.01); *H04W 24/10* (2013.01); *H04W 72/1289* (2013.01); H04L 5/0023 (2013.01); H04W 16/14 (2013.01); H04W 76/15 (2018.02)

(56) References Cited

U.S. PATENT DOCUMENTS

| | | | |
|---|---|---|---|
| 9,306,725 B2 | 4/2016 | Papasakellariou et al. | |
| 9,572,063 B2 | 2/2017 | Etemad et al. | |
| 9,603,091 B2 | 3/2017 | Baldemair et al. | |
| 2010/0111068 A1* | 5/2010 | Wu | H04L 1/1812 370/345 |
| 2013/0279361 A1 | 10/2013 | Seo et al. | |
| 2014/0036881 A1* | 2/2014 | Kim | H04L 5/001 370/336 |
| 2014/0036882 A1 | 2/2014 | Baghel et al. | |
| 2014/0071931 A1 | 3/2014 | Lee et al. | |
| 2014/0092878 A1* | 4/2014 | Davydov | H04W 4/70 370/336 |

\* cited by examiner

FIG. 9
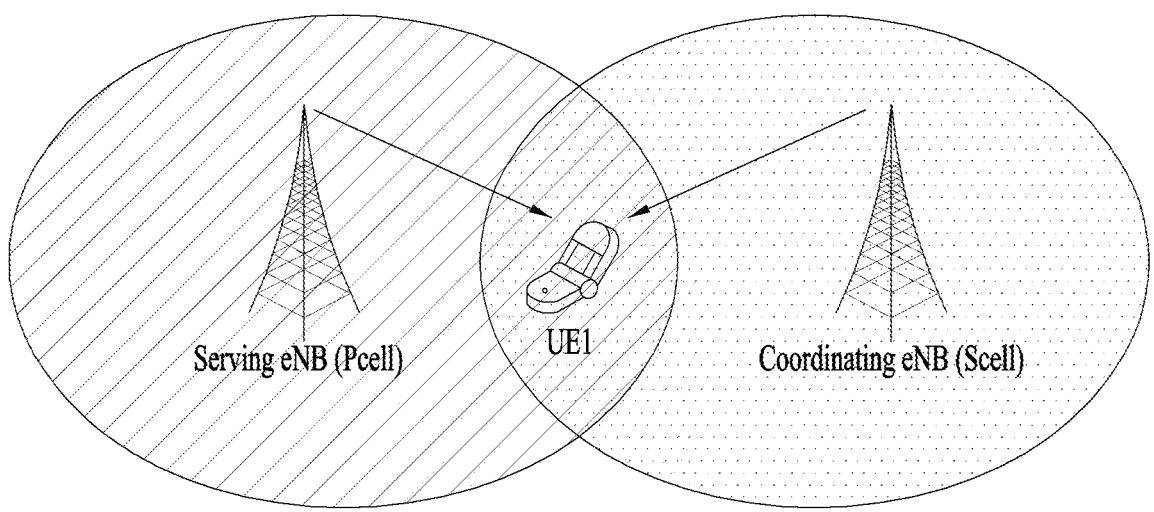
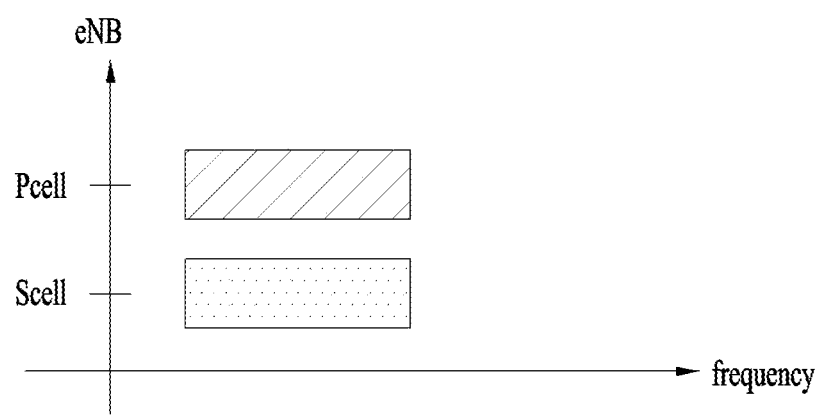

METHOD FOR REPORTING CHANNEL STATE INFORMATION ON TRANSMISSION OPPORTUNITY DURATION IN WIRELESS ACCESS SYSTEM SUPPORTING NON-LICENSED BAND, AND DEVICE SUPPORTING SAME

CROSS-REFERENCE TO RELATED APPLICATIONS

This application is a Continuation of U.S. patent application Ser. No. 15/307,704 filed on Oct. 28, 2016 (now U.S. Pat. No. 10,122,480 issued on Nov. 6, 2018), which was filed as the National Phase of PCT International Application No. PCT/KR2015/004320, filed on Apr. 29, 2015, which claims priority under 35 U.S.C. 119(e) to U.S. Provisional Application No. 61/986,087, filed on Apr. 29, 2014, all of which are hereby expressly incorporated by reference into the present application.

BACKGROUND OF THE INVENTION

Field of the Invention

The present invention relates to a wireless access system supporting an unlicensed band, and to a method for reporting channel state information on a transmission opportunity duration and a device supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

The present invention relates to a wireless access system supporting an unlicensed band, and more particularly to a method for reporting channel state information on a transmission opportunity (TxOP) duration and a method supporting the same.

One object of the present invention is to provide a method for efficiently transmitting and receiving data in a wireless access system supporting an unlicensed band and a licensed band.

Another object of the present invention is to provide various methods for defining a transmission opportunity (TxOP) duration in an unlicensed band and configuring the TxOP duration.

Still another object of the present invention is to provide a method for configuring CSI-IM within a TxOP duration to measure channel state information.

Further still another object of the present invention is to provide a method for measuring interference by using CSI-IM and methods for averaging interference.

Further still another object of the present invention is to provide devices for supporting the methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present invention relates to a wireless access system supporting an unlicensed band, and provides a method for reporting channel state information on a transmission opportunity (TxOP) duration and devices for supporting the same.

In one aspect of the present invention, a method for reporting channel state information (CSI) on a transmission opportunity (TxOP) duration in a wireless access system supporting carrier aggregation (CA) with an unlicensed band comprises the steps of receiving CSI interference measurement (CSI-IM) configuration information related to the TxOP duration through a primary cell (Pcell); measuring interference at subframes of a secondary cell (Scell), at which CSI-IM is configured, on the basis of the CSI-IM configuration information; measuring CSI of the TxOP duration of the Scell by using the interference; and transmitting the CSI to an eNB, wherein the Pcell is a serving cell configured in a licensed band, and the Scell is a serving cell configured in the unlicensed band.

At this time, the UE may measure the interference by using CSI-IM only included in the TxOP duration.

Otherwise, a period for configuring the CSI-IM may be configured to be smaller than a size of the TxOP duration, and the CSI-IM configuration information may include period information of the CSI-IM and size information of the TxOP duration.

Otherwise, the size of the TxOP duration and the period for configuring the TxOP duration are configured based on period information of the CSI-IM, and the CSI-IM configuration information may include period information P of the CSI-IM, period information K of the TxOP duration, and size information N of the TxOP duration.

At this time, the period information K may have a size of 2P, and the size information N may be set to P+1.

The UE may measure interference on all CSI-IMs configured within a CSI-IM duration to perform interference averaging. At this time, the CSI-IM duration may be configured in a unit of one or more subframes or one or more TxOP durations. Also, the UE may perform interference averaging by using only interference within a threshold value previously set based on a cumulative distribution function among interference values measured based on the CSI-IM duration.

The method may further comprise the steps of calculating a first interference average value by using all interferences measured within the CSI-IM duration; and calculating a second interference average value by using only interference less than the first interference average value among all the interferences measured within the CSI-IM duration.

In another aspect of the present invention, a UE for reporting channel state information (CSI) on a transmission opportunity (TxOP) duration in a wireless access system supporting carrier aggregation (CA) with an unlicensed band comprises a transmitter; a receiver; and a processor for controlling the transmitter and the receiver to report the CSI on the TxOP duration.

At this time, the processor may be configured to receive CSI interference measurement (CSI-IM) configuration information related to the TxOP duration through a primary cell (Pcell) by controlling the receiver, measure interference at subframes of a secondary cell (Scell), at which CSI-IM is configured, on the basis of the CSI-IM configuration information, measure CSI of the TxOP duration of the Scell by using the interference, and transmit the CSI to an eNB by controlling the transmitter, and the Pcell may be a serving cell configured in a licensed band, and the Scell may be a serving cell configured in the unlicensed band.

At this time, the processor may measure the interference by using CSI-IM only included in the TxOP duration.

Otherwise, a period for configuring the CSI-IM may be configured to be smaller than a size of the TxOP duration, and the CSI-IM configuration information may include period information of the CSI-IM and size information of the TxOP duration.

Otherwise, the size of the TxOP duration and the period for configuring the TxOP duration may be configured based on period information of the CSI-IM, and the CSI-IM configuration information may include period information P of the CSI-IM, period information K of the TxOP duration, and size information N of the TxOP duration. At this time, the period information K may have a size of 2P, and the size information N may be set to P+1.

The processor may measure interference on all CSI-IMs configured within a CSI-IM duration to perform interference averaging. At this time, the CSI-IM duration may be configured in a unit of one or more subframes or one or more TxOP durations. Also, the processor may perform interference averaging by using only interference within a threshold value previously set based on a cumulative distribution function among interference values measured based on the CSI-IM duration.

The processor may further be configured to calculate a first interference average value by using all interferences measured within the CSI-IM duration and calculate a second interference average value by using only interference less than the first interference average value among all the interferences measured within the CSI-IM duration.

It is to be understood that both the foregoing general description and the following detailed description of the present invention are exemplary and explanatory and are intended to provide further explanation of the invention as claimed.

As is apparent from the above description, the embodiments of the present invention have the following effects.

First of all, data can efficiently be transmitted and received in a wireless access system supporting an unlicensed band and a licensed band.

Secondly, methods for configuring CSI-IM within a TxOP duration can be provided, whereby a UE can more exactly measure CSI on the TxOP duration.

Thirdly, methods for configuring a CSI-IM duration can be provided, whereby a UE can perform interference averaging. As a result, unexpected interference generated due to a hidden node problem can be removed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

BRIEF DESCRIPTION OF THE DRAWINGS

The accompanying drawings, which are included to provide a further understanding of the invention, illustrate embodiments of the invention and together with the description serve to explain the principle of the invention.

FIG. 9 illustrates one of methods for transmitting SRS used in the embodiments of the present invention.

DETAILED DESCRIPTION OF THE EMBODIMENTS

Figure 1:
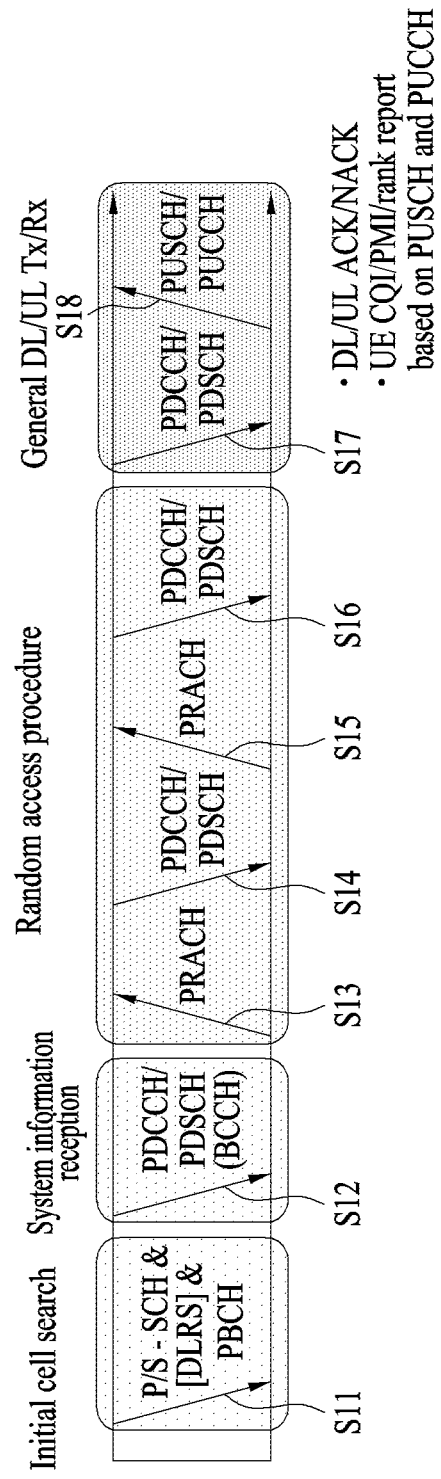
FIG. 1 is a conceptual diagram illustrating physical channels used in the embodiments and a signal transmission method using the physical channels.

The embodiments of the present invention, which will hereinafter be described in detail, relates to a wireless access system supporting an unlicensed band, a method for measuring interference on a transmission opportunity duration, a method for measuring and reporting channel state information by using the method and devices supporting the method.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
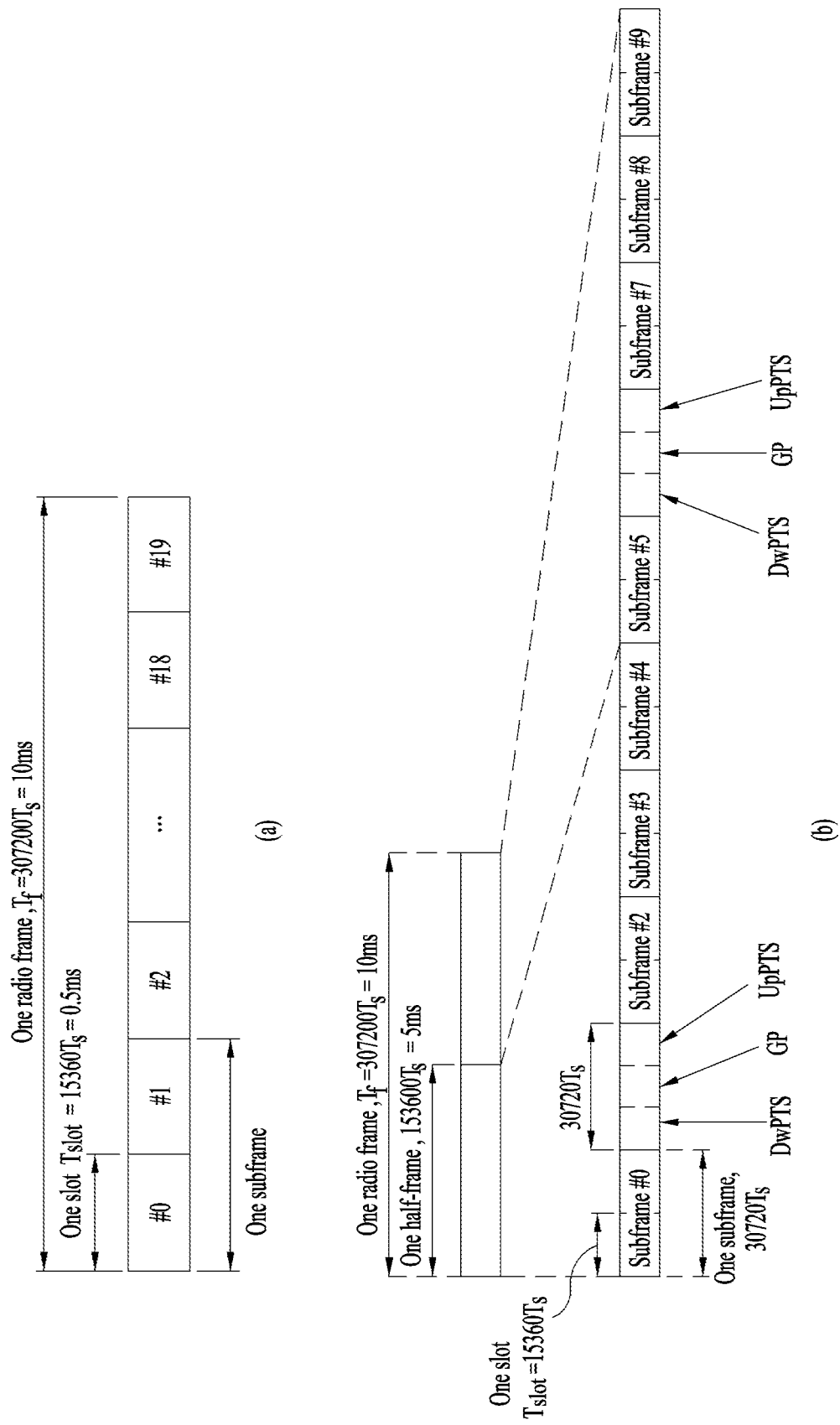
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 1-continued

| | | Normal cyclic prefix in downlink | | | | |
| | | UpPTS | | | Extended cyclic prefix in downlink | |
| | | Normal | Extended | | UpPTS | |
| Special subframe configuration | DwPTS | cyclic prefix in uplink | cyclic prefix in uplink | DwPTS | Normal cyclic prefix in uplink | Extended cyclic prefix in uplink |
|---|---|---|---|---|---|---|
| 7 | $21952 \cdot T_s$ | | | — | — | — |
| 8 | $24144 \cdot T_s$ | | | — | — | — |

Figure 3:
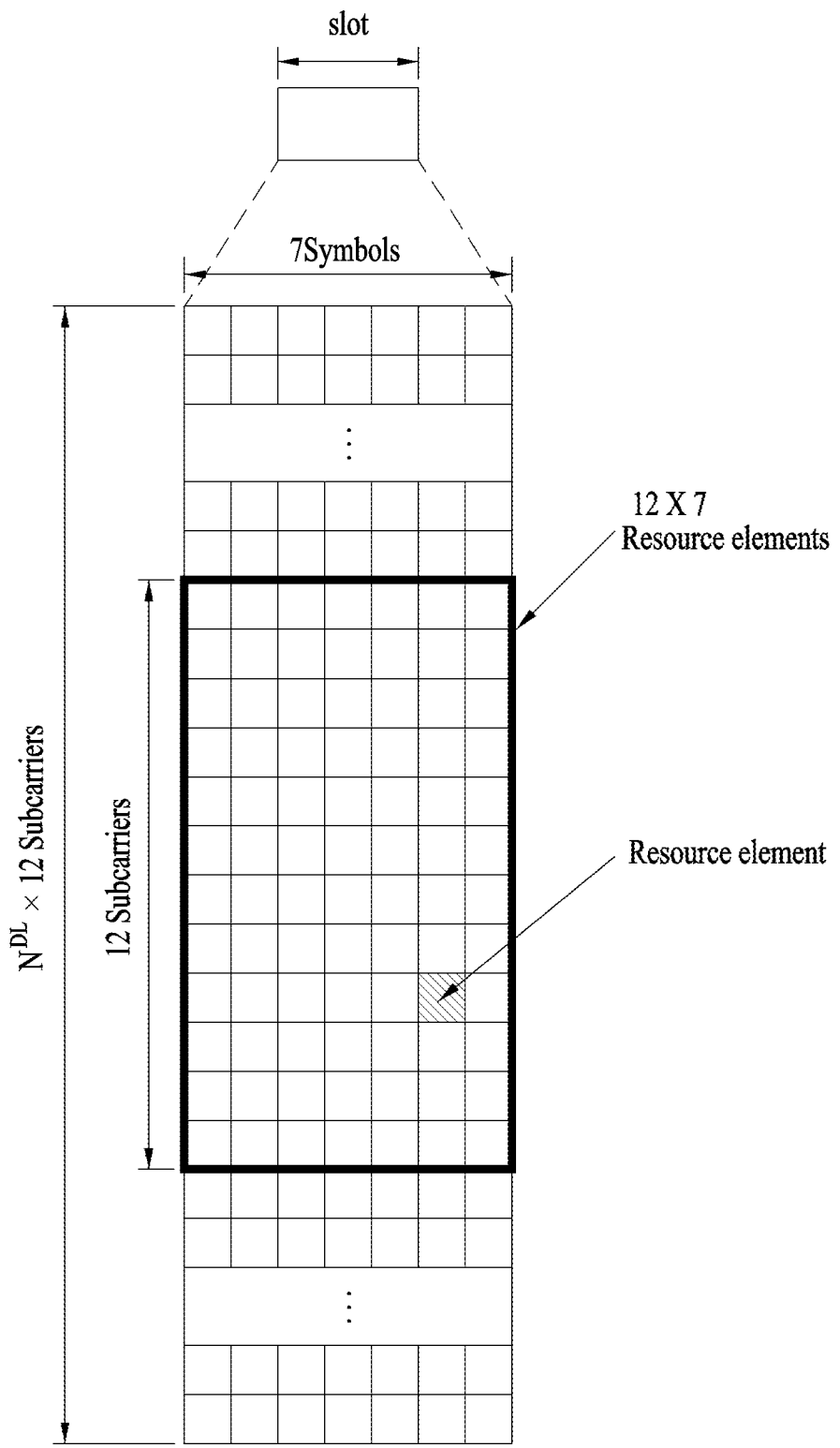
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
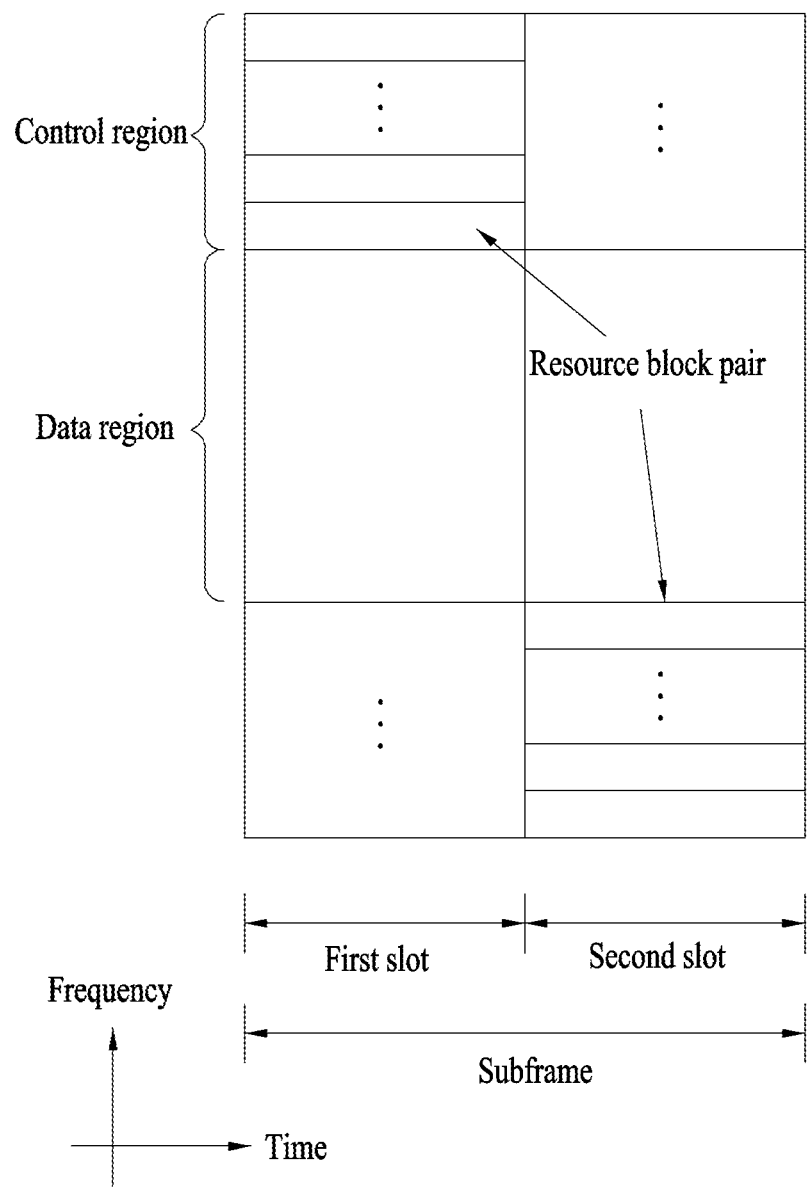
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
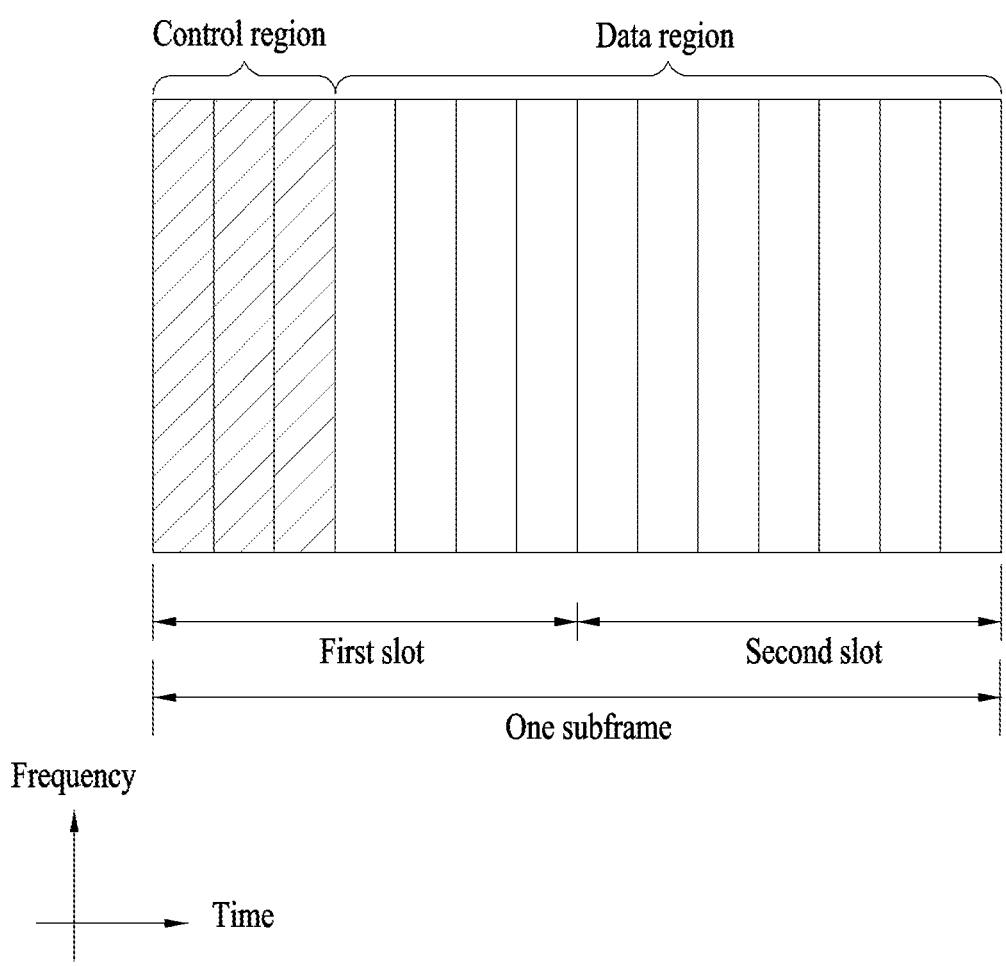
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ $(= \lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, m=0, Λ, $M^{(L)}-1$ i is the index of a CCE in each PDCCH candidate, and i=0, Λ, L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

where $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
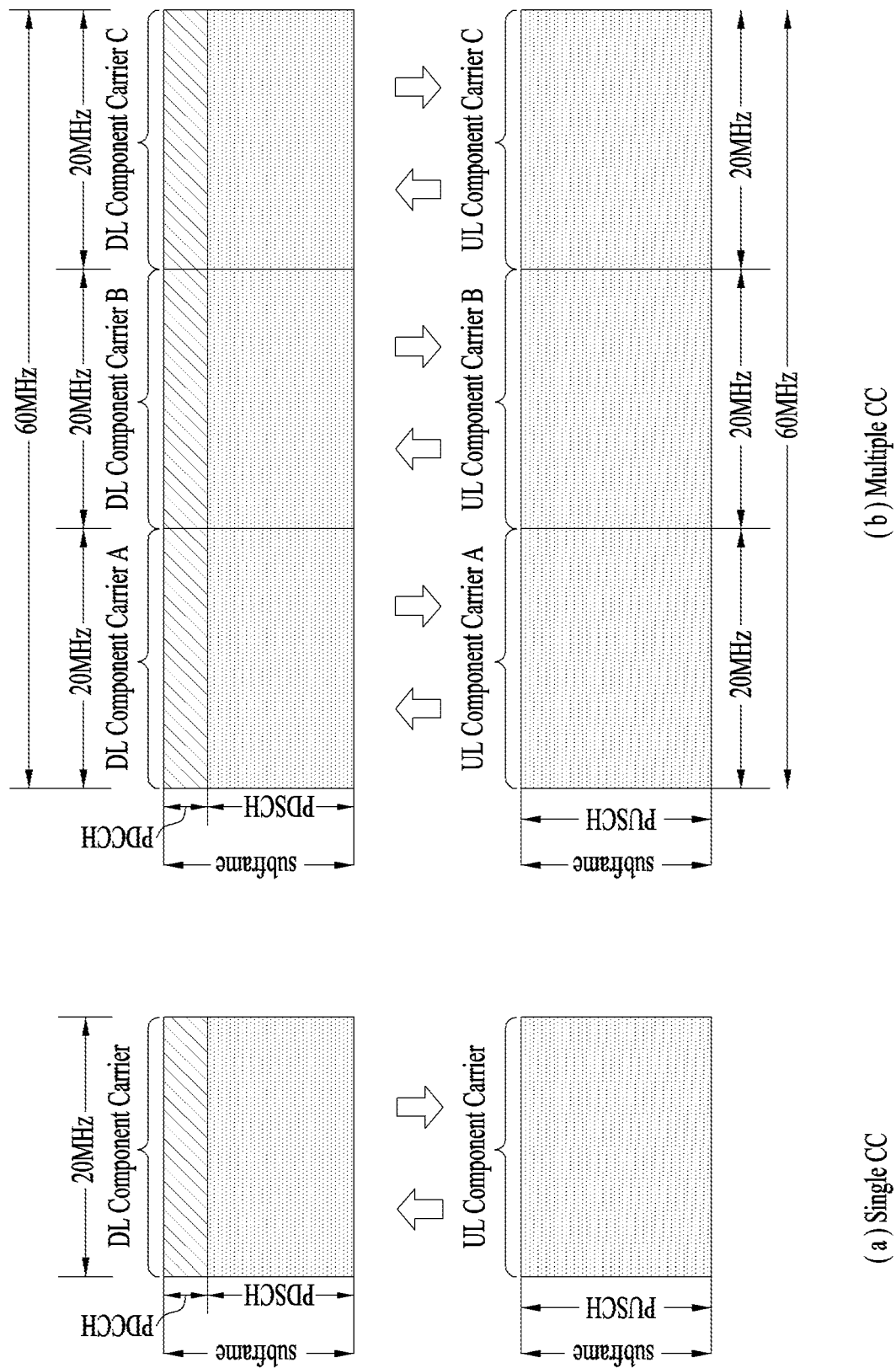
FIG. 6 is a diagram illustrating an example of a component carrier (CC) and carrier aggregation (CA) used in an LTE-A system.

FIG. 6 illustrates an example of CCs and CA in the LTE-A system, which are used in embodiments of the present disclosure.

FIG. 6($a$) illustrates a single carrier structure in the LTE system. There are a DL CC and a UL CC and one CC may have a frequency range of 20 MHz.

FIG. 6($b$) illustrates a CA structure in the LTE-A system. In the illustrated case of FIG. 6($b$), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
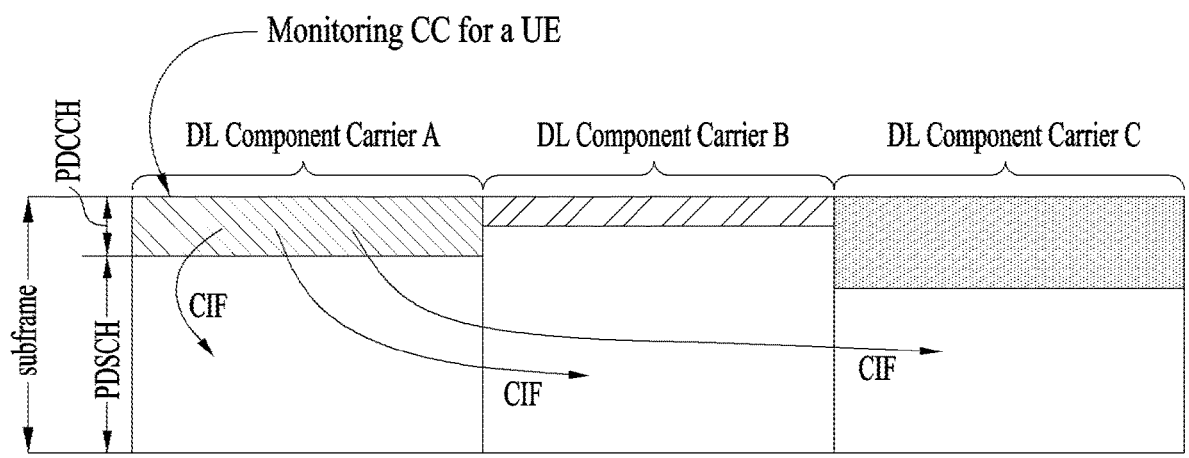
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
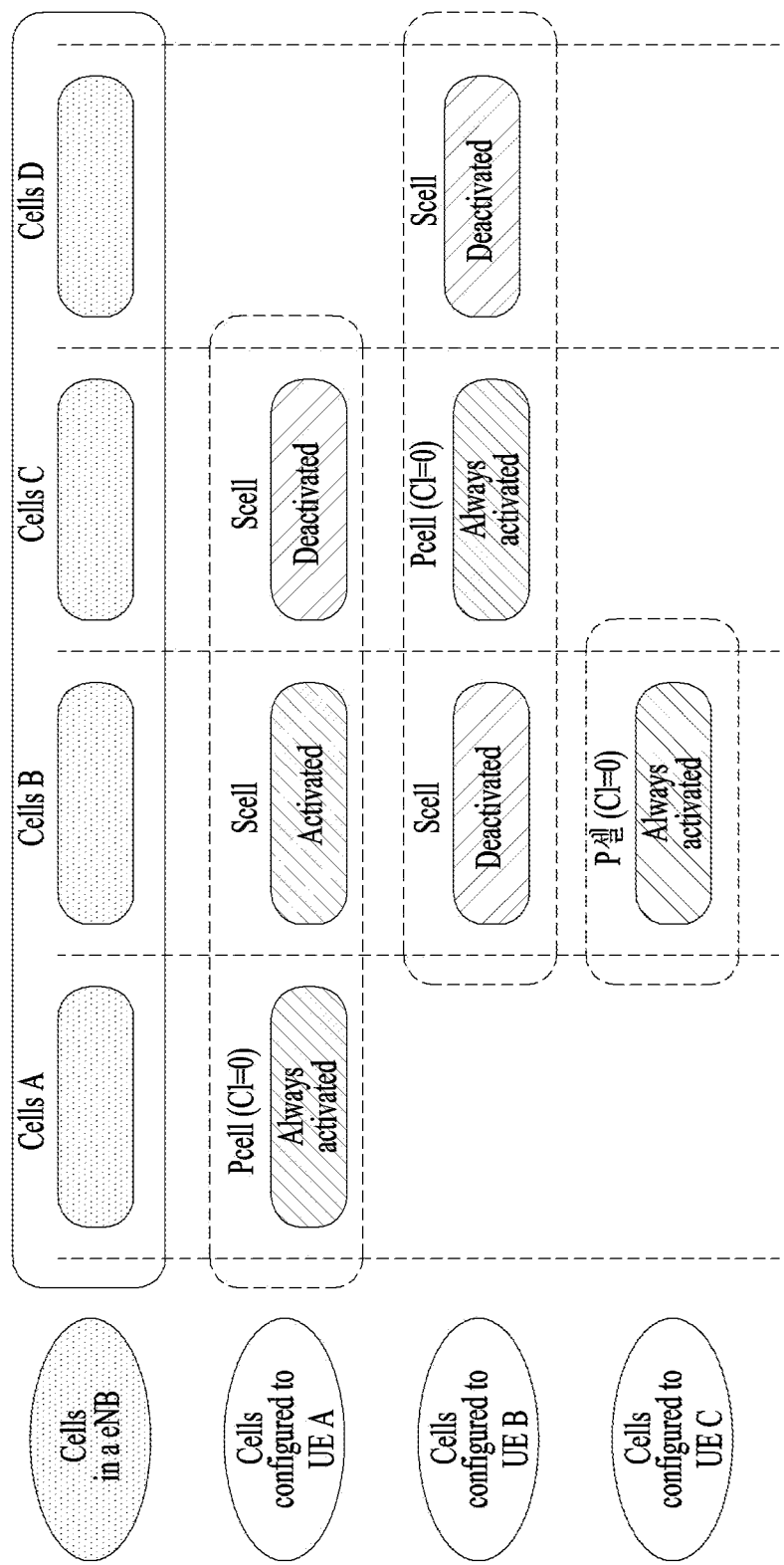
FIG. 8 is a conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of Pcell. In this case, Pcell is always activated, and Scell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment Based CoMP Operation

Hereinafter, a cooperation multi-point (CoMP) transmission operation applicable to the embodiments of the present invention will be described.

In the LTE-A system, CoMP transmission may be implemented using a carrier aggregation (CA) function in the LTE. FIG. 9 is a conceptual view illustrating a CoMP system operated based on a CA environment.

In FIG. 9, it is assumed that a carrier operated as a Pcell and a carrier operated as an Scell may use the same frequency band on a frequency axis and are allocated to two eNBs geographically spaced apart from each other. At this time, a serving eNB of UE1 may be allocated to the Pcell, and a neighboring cell causing much interference may be allocated to the Scell. That is, the eNB of the Pcell and the eNB of the Scell may perform various DL/UL CoMP operations such as joint transmission (JT), CS/CB and dynamic cell selection for one UE.

FIG. 9 illustrates an example that cells managed by two eNBs are aggregated as Pcell and Scell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the Pcell does not always need to participate in CoMP operation.

2.4 Reference Signal (RS)

Hereinafter, reference signals that can be used in the embodiments of the present invention will be described.

Figure 10:
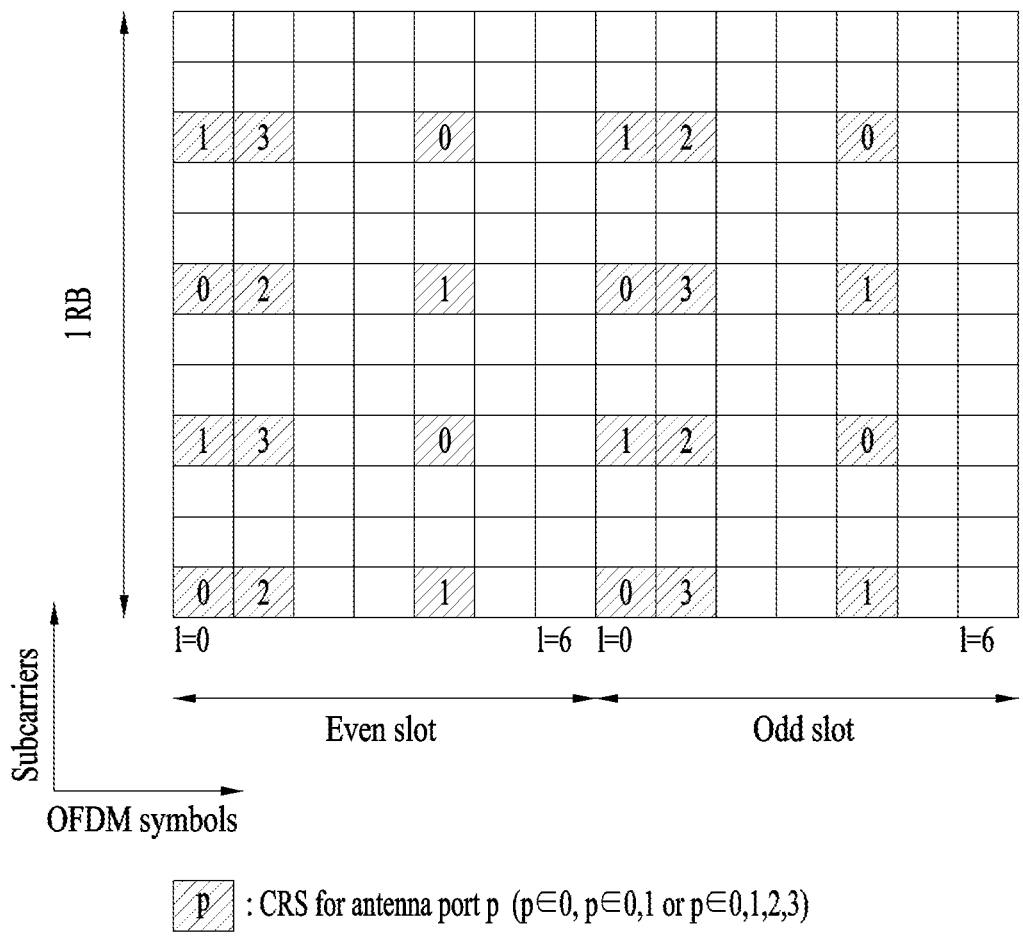
FIG. 10 illustrates an example of a subframe to which a cell specific reference signal (CRS) that can be used in the embodiments of the present invention is allocated.

FIG. 10 illustrates an example of a subframe to which a cell specific reference signal (CRS) that can be used in the embodiments of the present invention is allocated.

FIG. 10 illustrates an allocation structure of a CRS if four antennas are supported in a wireless access system. In a 3GPP LTE/LTE-A system, the CRS is used for decoding and channel state measurement. Therefore, the CRS is transmitted to all downlink bandwidths at all downlink subframes within a cell supporting PDSCH transmission, and is transmitted from all antenna ports configured in an eNB.

In more detail, CRS sequence is mapped to complex-valued modulation symbols used as reference symbols for an antenna port p at a slot $n_s$.

A UE may measure CSI by using the CRS, and may decode a downlink data signal received through a PDSCH at a subframe including the CRS, by using the CRS. That is, the eNB transmits the CRS from all RBs to a certain position within each RB, and the UE detects a PDSCH after performing channel estimation based on the CRS. For example, the UE measures a signal received at a CRS RE. The UE may detect a PDSCH signal from RE to which PDSCH is mapped, by using a ratio of receiving energy per CRS RE and a receiving energy per RE to which PDSCH is mapped.

As described above, if the PDSCH signal is transmitted based on the CRS, since the eNB should transmit the CRS to all RBs, unnecessary RS overhead is generated. To solve this problem, the 3GPP LTE-A system additionally defines UE-specific RS (hereinafter, UE-RS) and channel state information reference signal (CSI-RS) in addition to the CRS. The UE-RS is used for demodulation, and the CSI-RS is used to derive channel state information.

Since the UE-RS and the CRS are used for demodulation, they may be RSs for demodulation in view of use. That is, the UE-RS may be regarded as a kind of a demodulation reference signal (DM-RS). Also, since the CSI-RS and the CRS are used for channel measurement or channel estimation, they may be regarded as RSs for channel state measurement in view of use.

2.5 Enhanced PDCCH (EPDCCH)

In the 3GPP LTE/LTE-A system, cross carrier scheduling (CC S) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 11:
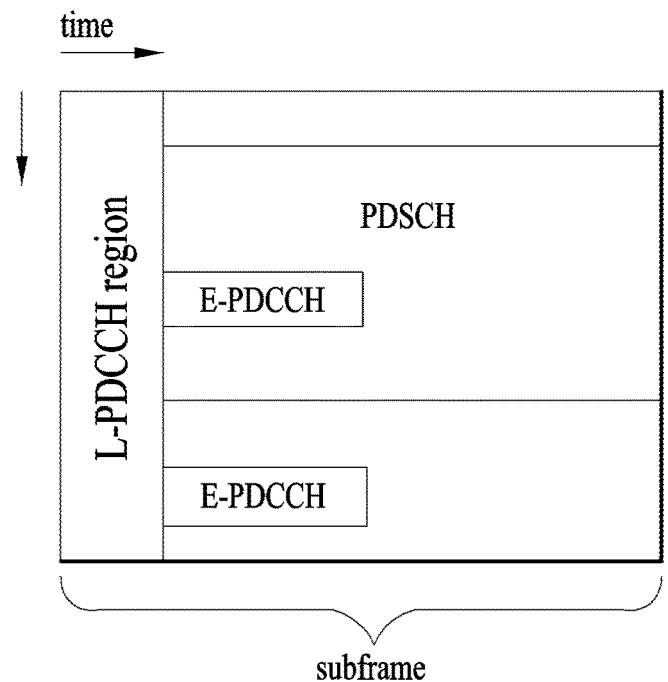
FIG. 11 illustrates an example that legacy PDCCH, PDSCH and E-PDCCH, which are used in an LTE/LTE-A system, are multiplexed.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 11 illustrates an example that legacy PDCCH, PDSCH and E-PDCCH, which are used in an LTE/LTE-A system, are multiplexed.

2.6 CSI Feedback on PUCCH

First of all, in the 3GPP LTE system, when a DL reception entity (e.g., a UE) is connected to a DL transmission entity (e.g., a BS), the DL reception entity performs measurement on a Reference Signal Received Power (RSRP) of a reference signal transmitted in DL, a quality of a reference signal Reference Signal Received Quality (RSRQ) and the like at a random time and is then able to make a periodic or even-triggered report of a corresponding measurement result to the base station.

Each UE reports a DL channel information in accordance with a DL channel status via uplink. A base station is then able to determine time/frequency resources, MCS and the like appropriate for a data transmission to each UE using the DL channel information received from the each UE.

Such CSI may include CQI, Precoding Matrix Indicator (PMI), Precoder Type Indication (PTI) and/or Rank Indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a Block Error Rate (BLER) under 10% in the received signal quality measured by a UE.

This channel information reporting may be classified into a periodic report transmitted periodically and an aperiodic report transmitted in response to a request made by a base station.

In case of the aperiodic report, it is set for each UE by a 1-bit request bit (CQI request bit) contained in UL scheduling information downloaded to a UE by a base station. Having received this information, each UE is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each UE by subframe unit and channel information in consideration of a transmission mode of each UE may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the PUCCH but on a PUSCH. In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 6 is provided to describe CSI feedback type transmitted on PUCCH and PUCCH CSI report mode.

transmission. In this case, RI is transmitted only in case of OL SM and a WB CQI represented as 4 bits may be transmitted. A best CQI (best-1) is transmitted on each Bandwidth Part (BP) and the best-1 CQI may be represented as 4 bits. And, an L-bit indicator indicating the best-1 may be transmitted together. If the RI is greater than 1, a CQI for a codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each BP and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

TABLE 6

|  |  | PMI Feedback Type | |
| --- | --- | --- | --- |
|  |  | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
|  | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to Table 6, in the periodic report of channel information, there are 4 kinds of reporting modes (mode 1-0, mode 1-2, mode 2-0 and mode 2-1) in accordance with CQI and PMI feedback types.

CQI can be classified into Wideband (WB) CQI and Subband (SB) CQI in accordance with CQI feedback type and PMI can be classified into No PMI or Single PMI in accordance with a presence or non-presence of PMI transmission. In Table 11, No PMI corresponds to a case of Open-Loop (OL), Transmit Diversity (TD) and single-antenna, while Single PMI corresponds to a case of Closed-Loop (CL).

The mode 1-0 corresponds to a case that WB CQI is transmitted in the absence of PMI transmission. In this case, RI is transmitted only in case of OL Spatial Multiplexing (SM) and one WB CQI represented as 4 bits can be transmitted. If RI is greater than 1, CQI for a $1^{st}$ codeword can be transmitted.

The mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a UE is set to make a PMI/RI reporting, or Modes 1-0 and 2-0 if a UE is set not to make a PMI/RI reporting
9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a BP corresponding to a portion of a bandwidth of a serving cell. An index is given to the bandwidth part in a frequency increasing order starting with a lowest frequency without an increment of a bandwidth.

$N_{RB}^{DL}$ Indicates the number of RBs of a serving cell system bandwidth. The system bandwidth may be divided into N (1, 2, 3, . . . N) SB CQI subbands. One SB CQI may include k RBs defined in Table 15. If the number of RBs of the whole bandwidth is not a multiple integer of k ($\lceil N_{RB}^{DL}/k \rceil - \lfloor N_{RB}^{DL}/k \rfloor > 0$) the number of RBs configuring a last (i.e., $N^{th}$) SB CQI may be determined by [Equation 4].

$$N_{RB}^{DL} - k \cdot \lfloor N_{RB}^{DL}/k \rfloor \qquad \text{[Equation 4]}$$

Table 17 shows relationship among subband size k, BP and system bandwidth $N_{RB}^{DL}$.

TABLE 17

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Moreover, $N_J$ CQI subbands configure one bandwidth part (BP) and a system bandwidth can be divided into J BPs. If J=1, $N_J$ is equal to $\lceil N_{RB}^{DL}/k/J \rceil$. If J>1, $N_J$ is equal to $\lceil N_{RB}^{DL}/k/J \rceil$ or $\lceil N_{RB}^{DL}/k/J \rceil - 1$. A UE calculates a CQI index for a preferred best one (best-1) CQI band in BP and may be then able to transmit the CQI index on PUCCH. In doing so, a best-1 indicator indicating what is the best-1 CQI subband selected from one BP may be transmitted together. The best-1 indicator may be configured with L bits, where the 'L' can be represented as [Equation 5].

$$L = \lceil \log_2[N_{RB}^{DL}/k/J] \rceil \qquad \text{[Equation 5]}$$

In the above UE-selected CQI reporting mode, it is able to determine a frequency band in which a CQI index is calculated.

In the following description, a CQI transmission period is explained.

Table 8 shows CQI and PMI payload sizes of each PUCCH CSI report mode.

TABLE 8

| | | | PUCCH Reporting Modes | | | |
|---|---|---|---|---|---|---|
| PUCCH Format | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/first PMI/ second PMI | 8 antenna ports RI = 1 | 8 | — | NA | NA |
| | | 8 antenna ports 1 < RI ≤ 4 | 11 | — | NA | NA |
| | | 8 antenna ports 4 < RI ≤ 7 | 9 | — | NA | NA |
| | | 8 antenna ports RI = 8 | 7 | — | NA | NA |
| 3 | RI | 2-layer spatial multiplexing | 1 | 1 | 1 | 1 |
| | | 4-layer spatial multiplexing | 2 | 2 | 2 | 2 |
| | | 8-layer spatial multiplexing | 3 | 3 | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

Referring to Table 8, each CQI/PMI and RI reporting type (PUCCH reporting type) supported for PUCCH CSI report mode can be described as follows.

Reporting Type 1 supports CQI feedback for a subband selected by a UE.

Reporting Type 1a supports subband CQI and $2^{nd}$ PMI feedback.

Reporting Type 2/2b/2c supports WB CQI and PMI feedback.

Reporting Type 2a supports WB PMI feedback.

Reporting Type 3 supports RI feedback.

Reporting Type 4 supports WB CQI.

Reporting Type 5 supports RI and WB PMI feedback.

Reporting Type 6 supports RI and PTI feedback.

A UE can receive information including a combination of a transmission period of channel information and an offset from an upper layer by RRC signaling. The UE can transmit the channel information to a base station based on the provided information on the channel information transmission period. In each serving cell, a period $N_{pd}$ in a subframe for a CQI/PMI reporting and an offset $N_{OFFSET,CQI}$ in the subframe are determined based on a parameter 'cqi-pmi-ConfigIndex' ($I_{CQI/PMI}$) set up by upper layer signaling [cf. Table 14 and Table 15]. An offset $N_{OFFSET,RI}$ related to a period $M_{RI}$ for an RI reporting is determined based on a parameter 'ri-ConfigIndex' ($I_{RI}$) [cf. Table 16]. The offset NOFFSET,RI for the RI reporting has a value of $\{0, -1 \ldots -(N_{pd}-1)\}$ In case that a UE is set to report abnormality of one CSI subframe set, the 'cqi-pmi-ConfigIndex' and the 'ri-ConfigIndex' correspond to the period and offset of CQI/PMI and RI for a subframe set 1, respectively. And, the 'cqi-pmi-ConfigIndex2' and the 'ri-ConfigIndex2' correspond to the period and offset of CQI/PMI and RI for a subframe set 2, respectively.

Table 9 shows the mapping relation between $N_{pd}$ and $N_{OFFSET,CQI}$ of a parameter ICQI/PMI in FDD.

TABLE 9

| $I_{CQI/PMI}$ | Value of $N_{pd}$ | Value of $N_{OFFSET,CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI}-2$ |
| $7 \leq I_{CQI/PMI} \leq 16$ | 10 | $I_{CQI/PMI}-7$ |
| $17 \leq I_{CQI/PMI} \leq 36$ | 20 | $I_{CQI/PMI}-17$ |
| $37 \leq I_{CQI/PMI} \leq 76$ | 40 | $I_{CQI/PMI}-37$ |
| $77 \leq I_{CQI/PMI} \leq 156$ | 80 | $I_{CQI/PMI}-77$ |
| $157 \leq I_{CQI/PMI} \leq 316$ | 160 | $I_{CQI/PMI}-157$ |
| $I_{CQI/PMI} = 317$ | | Reserved |
| $318 \leq I_{CQI/PMI} \leq 349$ | 32 | $I_{CQI/PMI}-318$ |
| $350 \leq I_{CQI/PMI} \leq 413$ | 64 | $I_{CQI/PMI}-350$ |
| $414 \leq I_{CQI/PMI} \leq 541$ | 128 | $I_{CQI/PMI}-414$ |
| $542 \leq I_{CQI/PMI} \leq 1023$ | | Reserved |

Table 10 shows the mapping relation between $N_{pd}$ and $N_{OFFSET,CQI}$ of a parameter ICQI/PMI in TDD.

TABLE 10

| $I_{CQI/PMI}$ | Value of $N_{pd}$ | Value of $N_{OFFSET,CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI}-1$ |
| $6 \leq I_{CQI/PMI} \leq 15$ | 10 | $I_{CQI/PMI}-6$ |
| $16 \leq I_{CQI/PMI} \leq 35$ | 20 | $I_{CQI/PMI}-16$ |
| $36 \leq I_{CQI/PMI} \leq 75$ | 40 | $I_{CQI/PMI}-36$ |
| $76 \leq I_{CQI/PMI} \leq 155$ | 80 | $I_{CQI/PMI}-76$ |
| $156 \leq I_{CQI/PMI} \leq 315$ | 160 | $I_{CQI/PMI}-156$ |
| $316 \leq I_{CQI/PMI} \leq 1023$ | | Reserved |

Table 11 shows the mapping relation between $M_{RI}$ and $N_{OFFSET,RI}$ of a parameter $I_{RI}$ in TDD.

TABLE 11

| $I_{RI}$ | Value of $M_{RI}$ | Value of $N_{OFFSET,RI}$ |
|---|---|---|
| $0 \leq I_{RI} \leq 160$ | 1 | $-I_{RI}$ |
| $161 \leq I_{RI} \leq 321$ | 2 | $-(I_{RI} - 161)$ |
| $322 \leq I_{RI} \leq 482$ | 4 | $-(I_{RI} - 322)$ |
| $483 \leq I_{RI} \leq 643$ | 8 | $-(I_{RI} - 483)$ |
| $644 \leq I_{RI} \leq 804$ | 16 | $-(I_{RI} - 644)$ |
| $805 \leq I_{RI} \leq 965$ | 32 | $-(I_{RI} - 805)$ |
| $966 \leq I_{RI} \leq 1023$ | | Reserved |

2.7 Restricted CSI Measurement

To mitigate the effect of interference between cells in a wireless network, network entities may cooperate with each other. For example, other cells except a cell A transmit only common control information without transmitting data during the duration of a specific subframe for which the cell A transmits data, whereby interference with a user receiving data in the cell A may be minimized.

In this way, interference between cells may be mitigated by transmitting only minimal common control information from other cells except a cell transmitting data at a specific time through cooperation between cells in a network.

For this purpose, if a higher layer configures two CSI measurement subframe sets CCSI,0 and CCSI,1, a UE may perform Resource-Restricted Measurement (RRM). At this time, it is assumed that CSI reference resources corresponding to the two measurement subframe sets belong to only one of the two subframe sets.

The following Table 12 illustrates an example of a higher-layer signal that configures CSI subframe sets.

TABLE 12

```
CQI-ReportConfig-r10 ::=    SEQUENCE {
    cqi-ReportAperiodic-r10         CQI-ReportAperiodic-r10     OPTIONAL,  --
Need ON
    nomPDSCH-RS-EPRE-Offset         INTEGER (-1..6),
    cqi-ReportPeriodic-r10          CQI-ReportPeriodic-r10      OPTIONAL,  --
Need ON
    pmi-RI-Report-r9                ENUMERATED {setup}          OPTIONAL,  --
Cond PMIRIPCell
    csi-SubframePatternConfig-r10   CHOICE {
        release                     NULL,
        setup                       SEQUENCE {
            csi-MeasSubframeSet1-r10    MeasSubframePattern-r10,
            csi-MeasSubframeSet2-r10    MeasSubframePattern-r10
}
```

TABLE 12-continued

```
    }                              OPTIONAL -- Need
ON
}
```

Table 12 illustrates an example of CQI report configuration (CQI-Report Config) message transmitted to configure CSI subframe sets. The CQI-Report configuration message may include an aperiodic CQI report cqi-ReportAperiodic-r10 Information Element (IE), a nomPDSCH-RS-EPRE-Offset IE, a periodic CQI report cqi-ReportPeriodic-r10 IE, a PMI-RI report pmi-RI-Report-r9 IE, and a CSI subframe pattern configuration csi-subframePatternConfig IE. At this time, the CSI subframe pattern configuration IE includes CSI measurement subframe set 1 information csi-MeasSubframeSet1 IE and a CSI measurement subframe set 2 information csi-MeasSubframeSet2 IE, which indicate measurement subframe patterns for the respective subframe sets.

In this case, each of the csi-MeasSubframeSet1-r10 IE and the csi-MeasSubframeSet2-r10 IE is 40-bit bitmap information representing information on subframes belonging to each subframe set. Also, aperiodic CQI report CQI-ReportAperiodic-r10 IE is used to configure an aperiodic CQI report for the UE, and the periodic CQI report CQI-ReportPeriodic-r10 is used to configure a periodic CQI report for the UE.

The nomPDSCH-RS-EPRE-Offset IE indicates a value of $\Delta_{offset}$. At this time, an actual value is set to $\Delta_{offset}$ value*2 [dB]. Also, the PMI-RI report IE indicates configuration or non-configuration of a PMI/RI report. Only when a transmission mode is set to TM8, TM9, or TM10, the E-UTRAN configures the PMI-RI Report IE.

3. LTE-U System
3.1 LTE-U System Configuration

Hereinafter, methods for transmitting and receiving data in a carrier aggregation environment of an LTE-A band corresponding to a licensed band and an unlicensed band will be described. In the embodiments of the present invention, an LTE-U system means an LTE system that supports such a CA status of a licensed band and an unlicensed band. A WiFi band or Bluetooth (BT) band may be used as the unlicensed band.

Figure 12:
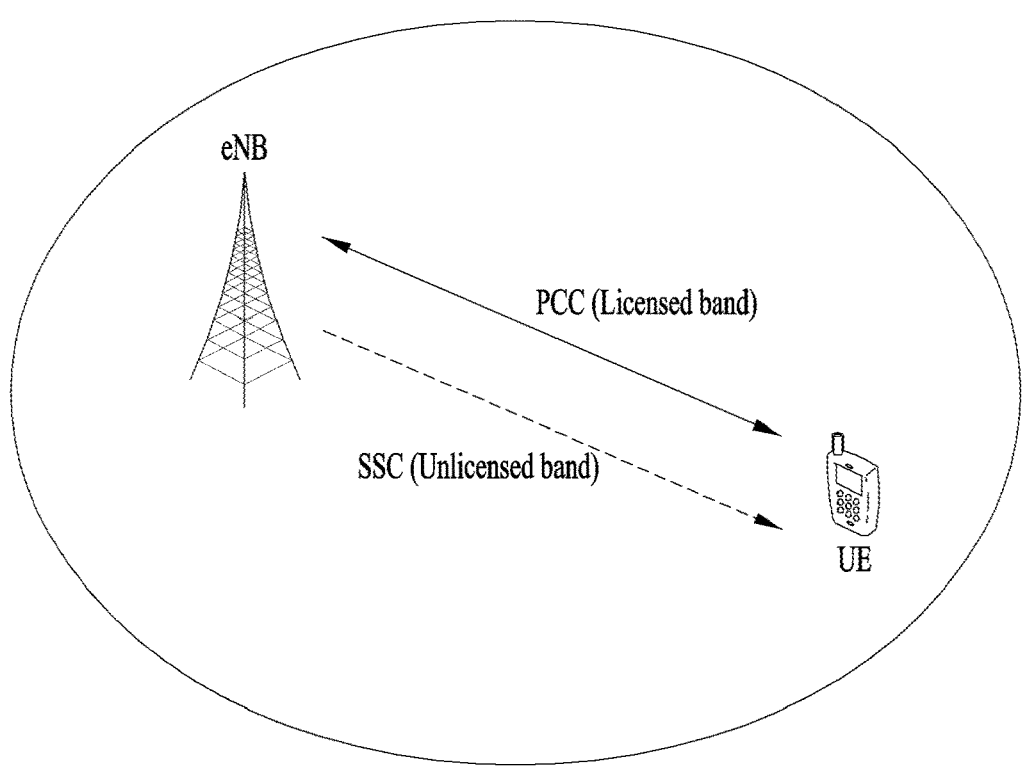
FIG. 12 illustrates an example of a CA environment supported in an LTE-U system.

FIG. 12 illustrates an example of a CA environment supported in an LTE-U system.

Hereinafter, for convenience of description, it is assumed that a UE is configured to perform wireless communication in each of a licensed band and an unlicensed band by using two component carriers (CCs). The methods which will be described hereinafter may be applied to even a case where three or more CCs are configured for a UE.

In the embodiments of the present invention, it is assumed that a carrier of the licensed band may be a primary CC (PCC or Pcell), and a carrier of the unlicensed band may be a secondary CC (SCC or Scell). However, the embodiments of the present invention may be applied to even a case where a plurality of licensed bands and a plurality of unlicensed bands are used in a carrier aggregation method. Also, the methods suggested in the present invention may be applied to even a 3GPP LTE system and another system.

In FIG. 12, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 12 is only example, and the embodiments of the present invention may be applied to even a CA environment that one UE accesses a plurality of eNBs.

For example, the UE may configure a macro eNB (M-eNB) and a Pcell, and may configure a small eNB (S-eNB) and an Scell. At this time, the macro eNB and the small eNB may be connected with each other through a backhaul network.

In the embodiments of the present invention, the unlicensed band may be operated in a contention-based random access method. At this time, the eNB that supports the unlicensed band may perform a carrier sensing (CS) procedure prior to data transmission and reception. The CS procedure determines whether a corresponding band is reserved by another entity.

For example, the eNB of the Scell checks whether a current channel is busy or idle. If it is determined that the corresponding band is idle state, the eNB may transmit a scheduling grant to the UE to allocate a resource through (E)PDCCH of the Pcell in case of a cross carrier scheduling mode and through PDCCH of the Scell in case of a self-scheduling mode, and may try data transmission and reception.

At this time, the eNB may configure a transmission opportunity (TxOP) duration comprised of N consecutive subframes. In this case, a value of N and a use of the N subframes may previously be notified from the eNB to the UE through higher layer signaling through the Pcell or through a physical control channel or physical data channel.

3.2 TxOP Duration

An eNB may transmit and receive data to and from one UE for a TxOP duration, and may configure a TxOP duration comprised of N consecutive subframes for each of a plurality of UEs and transmit and receive data in accordance with TDM or FDM. At this time, the eNB may transmit and receive data through a Pcell which is a licensed band and an Scell which is an unlicensed band for the TxOP duration.

However, if the eNB transmits data in accordance with a subframe boundary of an LTE-A system corresponding to a licensed band, a timing gap may exist between an idle determination timing of the Scell which is an unlicensed band and an actual data transmission timing. Particularly, since the Scell should be used as an unlicensed band, which cannot be used exclusively by a corresponding eNB and a corresponding UE, through CS based contention, another system may try information transmission for the timing gap.

Therefore, the eNB may transmit a reservation signal from the Scell to prevent another system from trying information transmission for the timing gap. In this case, the reservation signal means a kind of "dummy information" or "a copy of a part of PDSCH" transmitted to reserve a corresponding resource region of the Scell as a resource of the eNB. The reservation signal may be transmitted for the timing gap (i.e., from the idle determination timing of the Scell to the actual transmission timing).

3.3 Method for Configuring TxOP Duration

Figure 13:
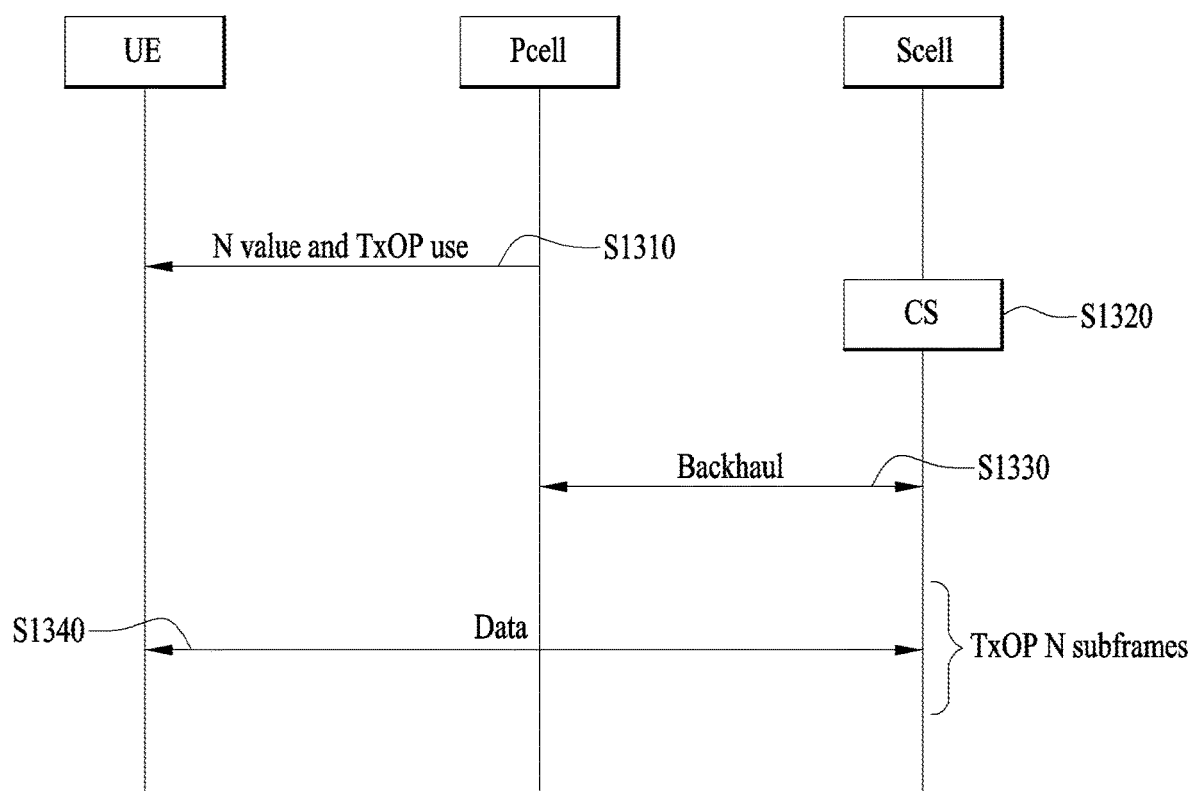
FIG. 13 illustrates one of methods for configuring a TxOP duration.

FIG. 13 illustrates one of methods for configuring a TxOP duration.

An eNB may previously configure a TxOP duration semi-statically through a Pcell. For example, the eNB may transmit a value of N corresponding to the number of subframes constituting the TxOP duration and configuration information on a use of the corresponding TxOP duration to a UE through a higher layer signal (for example, RRC signal) (S1310).

However, the step S1310 may be performed dynamically in accordance with system configuration. In this case, the eNB may transmit configuration information on the TxOP duration to the UE through a PDCCH or E-PDCCH.

The Scell may perform a carrier sensing (CS) procedure to check whether a current channel state is an idle state or a busy state (S1320).

The Pcell and the Scell may be managed by their respective eNBs different from each other or the same eNB. However, if the Pcell and the Scell are managed by different base stations, information on a channel state of the Scell may be delivered to the Pcell through a backhaul (S1330).

Afterwards, at a subframe configured as the TxOP duration, the UE may transmit and receive data through the Pcell and the Scell. If the use of the corresponding TxOP is configured for downlink data transmission at the step S1310, the UE may receive DL data through the Scell for the TxOP duration, and if the use of the corresponding TxOP is configured for uplink data transmission at the step S1310, the UE may transmit UL data through the Scell (S1340).

4. Method for Measuring and Reporting Interference 4.1 Interference Measurement at TxOP Duration An eNB should know CSI (e.g., CQI, RI, PMI) with a UE, which will receive DL data, to transmit downlink data by efficiently using a resource of an Scell. In the LTE/LTE-A system, the eNB transmits various kinds of reference signals (e.g., CRS, DM-RS, CSI-RS, CSI-IM). At this time, the CRS is transmitted every subframe (SF), the DM-RS is transmitted from RB for transmitting DL data, and the CSI-RS and the CSI-IM are transmitted at a predefined period (e.g., 5 ms, 10 ms, etc.).

The UE performs signal measurement (SM) and interference measurement (IM) through the reference signal and calculates proper CSI (e.g., CQI, RI, PMI) on the basis of the measured result. Also, the UE reports the CSI to the eNB periodically or aperiodically. The eNB which has received periodic or aperiodic CSI report may configure a proper MCS level on the basis of the CSI for a UE which will receive DL data, and may transmit the DL data in accordance with the corresponding MCS level.

At this time, in case of the LTE-A system operated in a licensed band, if CSI-IM is configured through cooperative transmission between neighboring eNBs, the UEs may measure desired interference on the basis of the configured CSI-IM. However, in case of an unlicensed band (for example, TxOP duration of Scell), since the UE is operated in a contention based random access mode, even though CSI-IM is configured periodically, it is not certain that data of the eNB will be transmitted at SF at which the CSI-IM will be transmitted. Also, even though DL data are transmitted, unexpected interference may occur due to a hidden node problem that another eNB or system which is not checked by CS at the corresponding subframe transmits data. Therefore, to solve this, the present invention suggests a method for defining valid CSI-IM and configuring CSI-IM and an effective interference averaging method.

4.2 Method for Configuring CSI-IM in Scell

In the embodiments of the present invention, the eNB may configure and manage the TxOP duration described in section 3. That is, the eNB may perform scheduling for the Pcell of the licensed band and the Scell of the unlicensed band. If the eNB of the Pcell and the eNB of the Scell are different from each other, the two eNBs may be operated in cooperation with each other by using the Pcell and the Scell.

4.2.1 Method 1 for Configuring CSI-IM

As one embodiment of the present invention, CSI-IM is configured in accordance with a configuration period defined in the LTE/LTE-A system, and it may be defined that only CSI-IM corresponding to the TxOP duration is valid.

Figure 14:
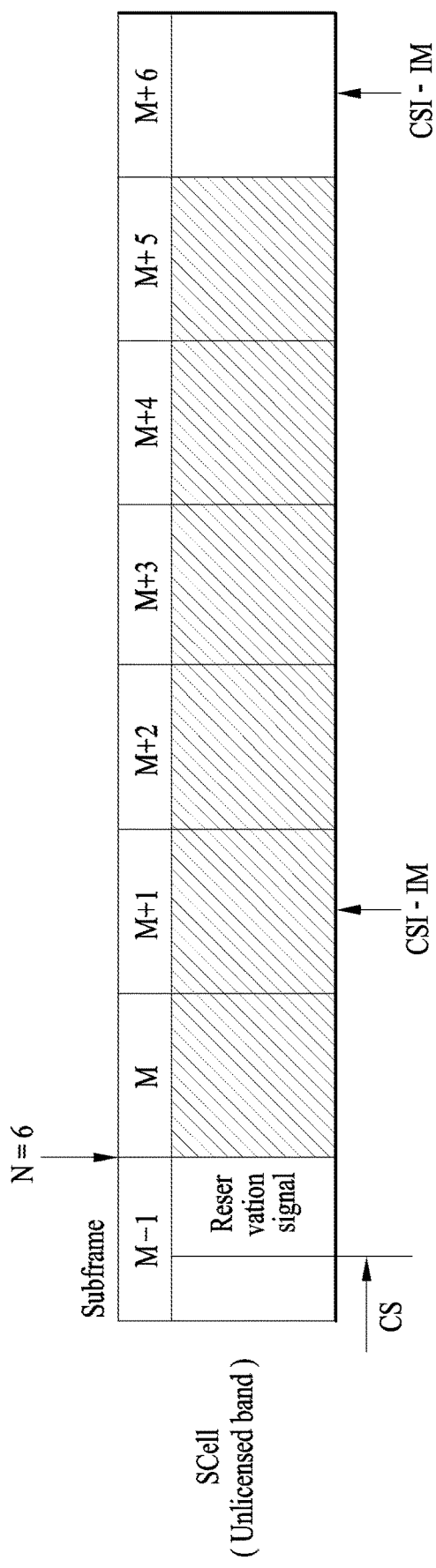
FIG. 14 illustrates one of methods for configuring CSI-IM transmitted from an Scell.

FIG. 14 illustrates one of methods for configuring CSI-IM transmitted from an Scell.

An Scell operated in an unlicensed band is shown in FIG. 14, and it is assumed that a size N of the TxOP duration corresponds to 6 SFs. Referring to FIG. 14, the eNB determines whether a corresponding cell is an idle state by performing carrier sensing (CS) at a subframe index M−1 (i.e., SF # M−1) of the Scell, and transmits a reservation signal until next SF # M if the corresponding cell is an idle state. Also, the eNB transmits DL data to the UE continuously for 6 SFs corresponding to the size of the TxOP duration, which is previously configured through the Scell.

At this time, it is assumed that a starting point SF # M of the TxOP duration is designated through previously defined signaling (for example, higher layer signaling or physical control/data channel). Also, it may previously be defined that a period of CSI-IM is 5 ms and is configured at SF # M+1 and SF # M+6. At this time, since the eNB has tried DL data transmission at SF # M+1, a neighboring eNB or another system (i.e., non-LTE system), which may sense DL data transmission, does not try DL data transmission at the corresponding SF. On the other hand, since the eNB does not transmit DL data at SF # M+6, another system (i.e., non-LTE system) may determine an idle state and then try data transmission at the corresponding SF in view of operation features of the unlicensed band.

Therefore, if the UE performs IM through CSI-IM within SF (e.g., SF # M+6) which does not belong to the TxOP duration, the UE may obtain a wrong IM result. Therefore, in the embodiments of the present invention, it is preferable that only CSI-IM within the TxOP duration is defined as valid CSI-IM and the UE performs IM through the CSI-IM.

In the embodiments of the present invention, higher layer signaling may mean RRC signal, MAC signal, etc., a physical channel means a PDCCH, and a physical data channel means a PDSCH. At this time, E-PDCCH may be transmitted to the physical data channel.

4.2.2 Method 2 for Configuring CSI-IM

As another embodiment of the present invention, a position of CSI-IM may be configured based on a previously configured period (for example, through higher layer signaling or physical control/data channel) or SF offset from a starting point of TxOP.

Figure 15:
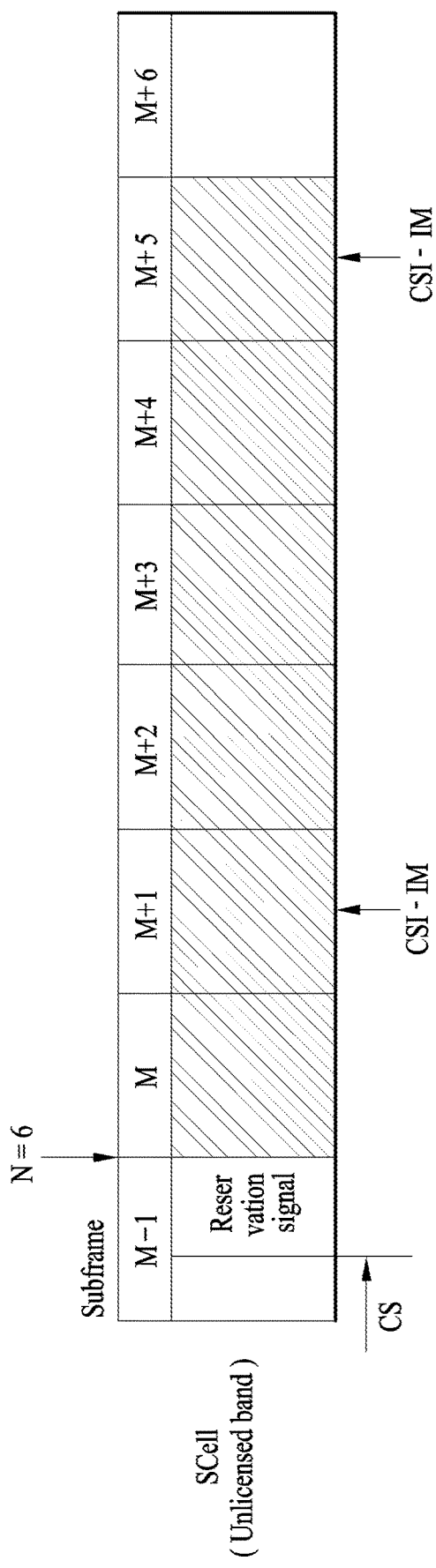
FIG. 15 illustrates another one of methods for configuring CSI-IM transmitted from an Scell.

FIG. 15 illustrates another one of methods for configuring CSI-IM transmitted from an Scell.

The eNB may be configured to configure CSI-IM of at least two or more times within the TxOP duration by configuring a period P of CSI-IM configured in the Scell semi-statically to be smaller than the number N of SFs included within the TxOP duration (P<N).

For example, in FIG. 15, it is assumed that a period of CSI-IM corresponds to 4 SFs and SF offset for indicating a subframe at which CSI-IM is configured is set to 1. In this case, the eNB may configure CSI-IM at SF # M+1 after 1 SF and SF # M+5 after 4 SFs based on the starting point of TxOP. Therefore, although the number of valid CSI-IMs is 1 in FIG. 15, since the number of valid CSI-IMs is 2 in FIG. 15, the eNB may increase the number of valid CSI-IMs by configuring CSI-IM semi-statically in accordance with the TxOP duration occurring irregularly. Therefore, the UE may obtain the more exact IM result.

4.2.3 Method 3 for Configuring CSI-IM

If the Scell of the unlicensed band is used for data offloading of the Pcell, the actual TxOP duration may occur irregularly (i.e., aperiodic). Therefore, if the eNB periodically configures a CSI-IM resource like the LTE-A system (i.e., Rel-11) (e.g., CSI-IM configuration of 5 ms), the number of valid CSI-IMs may be reduced in case of the method described in section 4.3.1. To solve this, the TxOP duration on the Scell may be configured periodically, whereby CSI-IM resource may be configured efficiently. That is, if the eNB properly configures a period of the TxOP and a size of the TxOP duration in accordance with a configuration period of the CSI-IM resource, the number of valid CSI-IMs may be increased.

In the embodiments of the present invention, a configuration period of the CSI-IM resource may be defined as 'P', a period of the TxOP duration may be defined as 'K', and the size of the TxOP duration may be defined as 'N'. At this time, if the eNB is configured to have a value of K=2P and a size of N=P+1, the number of valid SFs at which CSI-IM resource is configured may be assured of at least 2 or more within one TxOP period.

At this time, the period 'K' of the TxOP duration, the configuration period 'P' of the CSI-IM resource, and the size 'N' of the TxOP duration may be notified from the eNB to the UE through a higher layer signal (e.g., RRC signal) or physical control/data channel.

Figure 16:
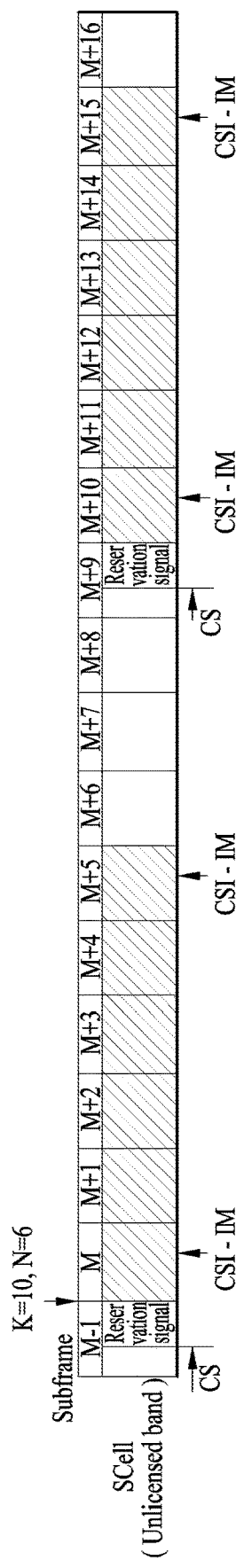
FIG. 16 illustrates still another one of methods for configuring CSI-IM transmitted from an Scell.

FIG. 16 illustrates still another one of methods for configuring CSI-IM transmitted from an Scell.

Referring to FIG. 16, since a period 'P' of the CSI-IM is set to 5 ms, the CSI-IM resource may be allocated to SF # M, M+5, M+10, M+15. Also, it is assumed that the period 'K' of the TxOP duration corresponds to 10 SFs and the size 'N' of one TxOP duration is set to 6 SFs. At this time, since all of the configured CSI-IMs exist within the TxOP duration, all CSI-IMs are valid. That is, the period of the TxOP and the TxOP duration are configured properly in accordance with the configuration period of the allocated CSI-IM resource, whereby the number of valid CSI-IMs may be increased.

Figure 17:
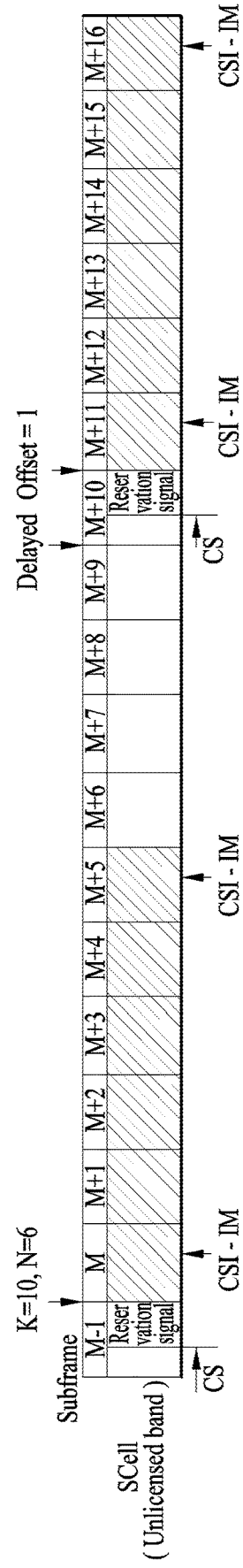
FIG. 17 illustrates further still another one of methods for configuring CSI-IM transmitted from an Scell.
Figure 18:
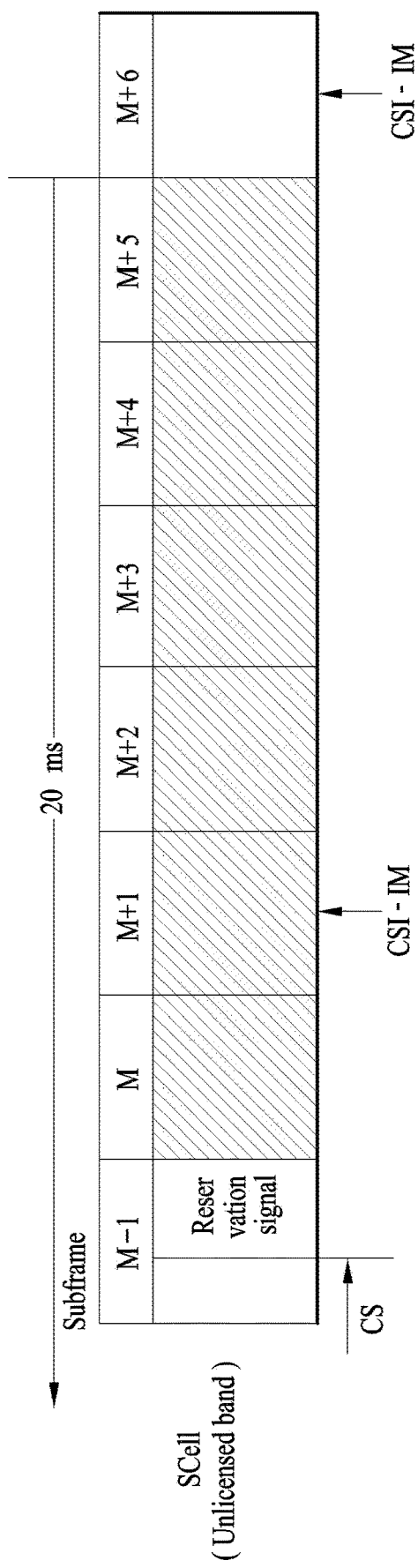
FIG. 18 illustrates an example of TxOP subframe configuration when a duration value for interference averaging is set.

FIG. 17 illustrates further still another one of methods for configuring CSI-IM transmitted from an Scell.

The eNB may fail to start the TxOP duration from a desired SF due to a channel state in view of features of an unlicensed band operation. For example, although the TxOP duration is tried to start from SF # M+10 as shown in FIG. 17, if it is determined that a busy state is continuously maintained as a result of CS, actual TxOP starting SF may be delayed as much as 1 SF or more. In this case, the eNB may notify the UE that the starting point of the TxOP duration has been delayed at SF # M+10, through PDCCH or E-PDCCH of the Pcell, and may notify the UE how many SFs have been delayed at the actual TxOP starting point.

Since 1 SF has been delayed in FIG. 17, at SF # M+11, the eNB may notify the UE of the delay through (E)PDCCH of the Pcell, and the Scell may be configured to give 1 SF offset at the CSI-IM resource position. That is, since the TxOP starting point has been delayed as much as 1 SF, CSI-IM may be configured at SF # M+11, M+16 delayed as much as 1 SF, whereby the number of valid CSI-IMs may be increased.

4.3 Method for Averaging Interference 4.3.1 CSI-IM Measurement Duration Configuration For a window size for averaging interference measured from valid CSI-IM, the eNB may configure a CSI-IM duration. At this time, the CSI-IM duration indicating a window size may be configured by 1) time corresponding to several msec, 2) one TxOP duration, or 3) a plurality of TxOP durations.

At this time, a CSI-IM duration value may previously be notified from the eNB to the UE through a higher layer signal (via PCell) or physical control/data channel. For example, if the CSI-IM duration value is 1 TxOP duration, the eNB and/or the UE initiates an interference averaging value every TxOP duration. If the CSI-IM duration corresponds to 6 TxOP durations, the UE may measure interference by using all of CSI-IM resources on the 6 TxOP durations. In the embodiments of the present invention, this will be referred to as interference averaging.

Figure 19:
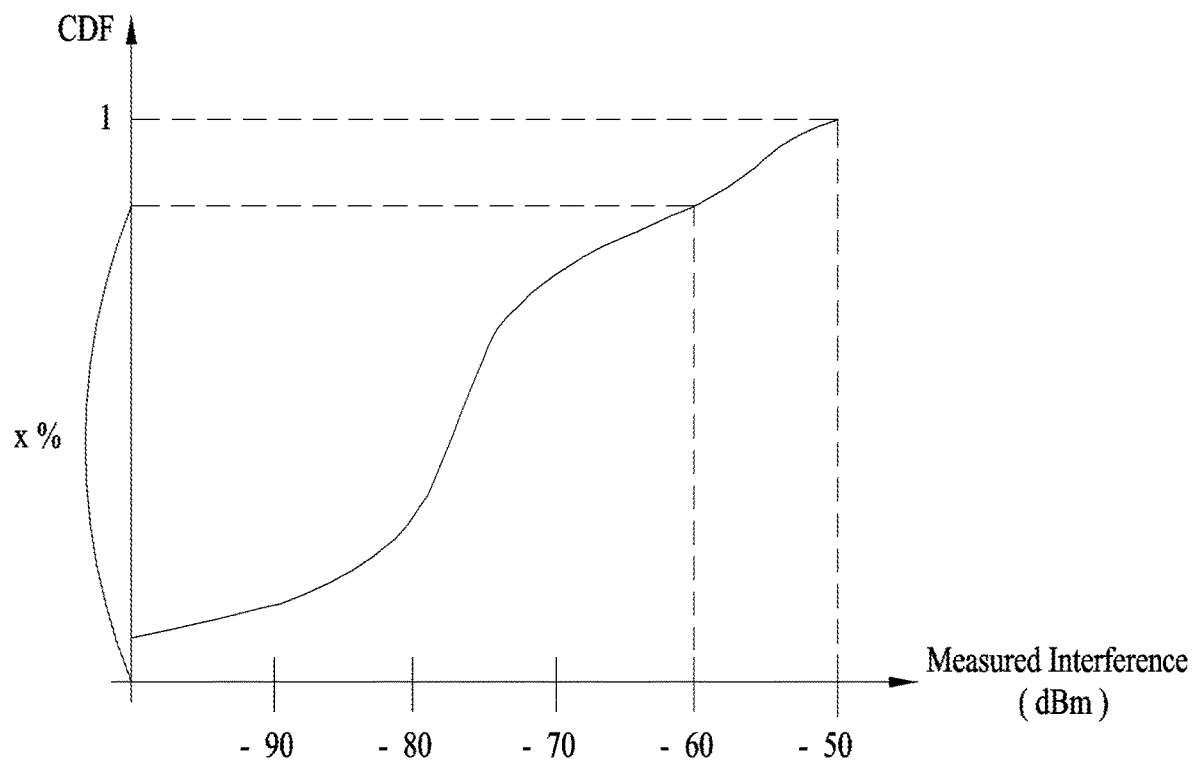
FIG. 19 illustrates an example of CDF distribution for interference averaging.

The CSI-IM duration for interference averaging may be configured based on SF at which a current TxOP duration ends. For example, if the configured CSI-IM duration is 20 ms duration, the UE may perform interference averaging by using all of valid CSI-IM resources for 20 ms based on SF # M+5 at which the current TxOP duration ends in FIG. 19. At this time, valid CSI-IM may be defined by the method suggested in the section 4.2.1. FIG. 19 illustrates an example of TxOP subframe configuration when a duration value for interference averaging is set.

In another aspect of the present invention, if it is determined that reliable CSI measurement is not performed as there is no valid CSI-IM resource for the configured CSI-IM duration or there are a small number of valid CSI-IMs, the eNB may feed a CSI (e.g., CQI/RI/PMI) value corresponding to a previously defined initial value back through a higher layer signal or physical control/data channel. At this time, as an example of the initial value, CQI value may be set to 'Out of Range' value.

4.3.2 Method for Using Long-Term Channel Statistics

In view of features of unlicensed band operation, another system (e.g., non-LTE system) may try data transmission even for a TxOP duration due to a hidden node problem. For example, even though the UE belongs to the TxOP duration like SF # M+1 in FIG. 14, the UE may measure too high interference due to data transmission of another system, which is caused by a hidden node problem.

For example, it is assumed that the eNB configures a CSI-IM duration as one TxOP duration in section 4.3.1. At this time, the UE may measure too high interference due to a hidden node problem at the corresponding TxOP duration and calculate a CQI value based on the measured interference to feed the calculated CQI value back. In this case, the UE may be allocated with an MCS level too lower than a normal state. Therefore, DL data transmission for the UE may be managed very inefficiently.

That is, if the UE reports CSI (e.g., CQI, etc.) to the eNB by using only a simple averaging value of measured interference, a too low MCS level may be allocated by interference caused by a hidden node problem. To solve this, the UE may be configured to use long-term channel statistics for an interference measurement value.

At this time, as an example of statistics, a variance value as well as an interference average value may be used.

As another example of statistics, a cumulative distribution function (CDF) distribution of an interference value may be used. For example, the UE may select MCS having a block error rate (BLER) of 10% in an interference status of a high x % as CQI and report the corresponding CQI to the eNB.

That is, the UE may report, to the eNB, CQI of a condition or more previously configured based on an average value, variance value and/or CDF distribution of interference with respect to the interference value measured based on the CSI-IM duration for interference averaging.

FIG. 19 illustrates an example of CDF distribution for interference averaging.

The UE may store CDF distribution of FIG. 19 based on a histogram of a measured interference value. At this time, an interference status of high x % in FIG. 19 means that an interference value measured by the UE is −60 dBm or less. Therefore, the UE may perform interference averaging except interference values exceeding −60 dBm. The UE may select MCS having a block error rate (BLER) of 10% as CQI based on interference average values obtained through this interference averaging and report the corresponding CQI to the eNB.

4.3.3 Method for Averaging Interference Using Two Interference Averaging Values

As another method for solving interference averaging distortion due to a hidden node problem on a TxOP duration, the UE may configure two interference averaging values based on a specific threshold value. For example, one may be a first interference average (i.e., Type A average) for a whole CSI-IM duration, and the other one may be a second interference average (i.e., Type B average) except interference determined to be too high.

In this case, if interference measured for a random CSI-IM duration is higher than the first interference average value as much as a threshold value or more, the UE may exclude the corresponding interference from the second interference average value. At this time, the threshold value may previously be notified from the eNB to the UE through a higher layer signal or physical control/data channel.

Therefore, the UE may calculate two CQI values through two IM values (i.e., Type A average value and Type B average value). For example, the CQI value calculated based on the first interference average by the UE may be defined as a first CQI value (i.e., Type A CQI), and the CQI value calculated based on the second interference average (i.e., Type B average) by the UE may be defined as a second CQI value (i.e., Type B CQI).

At this time, the first CQI value may be construed as a conservative CQI value considering interference of another system due to a hidden node problem, and the second CQI value may be construed as an aggressive CQI value in an ideal environment having no interference from another system.

In this case, the UE may report only one representative CQI value of the two CQI values (e.g., first and second CQI values) to the eNB. Also, the UE may report an index for the corresponding CQI value to indicate which CQI value is reported, during CQI report.

Otherwise, the UE may select one of the two CQI values based on the long-term channel statistics described in the section 4.3.2 and report only the selected CQI to the eNB.

Otherwise, the UE may report the two CQI values to the eNB. At this time, which one of the two CQI values which are fed back will be selected or how the two CQI values will be used properly may be determined by the eNB. If the UE notifies the eNB of both the two CQI values, the UE may report a differential value (or offset value) of the two CQI values to the eNB. For example, the UE may report one of the first CQI value and the second CQI value and additionally report a differential value of the two CQI values to reduce signaling overhead.

4.3.4 Method for Interworking Aperiodic CSI Triggering

The UE may regard that a valid CSI-IM resource previously defined (or signaled) exists on a CSI reference resource only interworking with aperiodic CSI triggering for the Scell. In other words, the UE may assume that a CSI-IM resource which is not interworking with aperiodic CSI triggering does not exist. In this case, the UE may measure interference by using the valid CSI-IM only on the CSI reference resource interworking with aperiodic CSI triggering.

In order that the UE should know an exact position of the valid CSI-IM in the sections 4.3.1 to 4.3.3, the UE should explicitly know when the TxOP duration starts and when the TxOP duration ends. That is, it is preferable that the eNB notifies UEs, which perform CSI measurement, other than a UE which is scheduled a PDSCH for the TxOP duration, of the TxOP duration (for example, through a common search space (CSS)).

However, notification of the TxOP duration to other UEs other than the UE, which actually receives a PDSCH every TxOP duration, through the CSS may be high overhead in view of the eNB. Therefore, instead of notifying all UEs of a starting point and an end point of the TxOP duration, the eNB may notify whether a PDSCH is actually scheduled at SFs at which the TxOP duration is allocated, through DCI in the same manner as the legacy LTE/LTE-A system. That is, although the UE does not know the starting point and the end point of the TxOP duration explicitly, the UE may be operated to receive the PDSCH if there is DCI at the corresponding SF and so as not to receive the PDSCH if there is no DCI at the corresponding SF.

As described above, if the UE does not know the starting point and the end point of the TxOP, each UE may have a difficulty in finding the valid CSI-IM resource. At this time, it may be assumed that CSI-IM is valid at only SF interworking with aperiodic CSI triggering.

Figure 20:
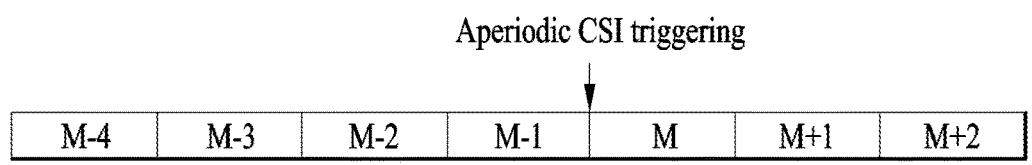
FIG. 20 illustrates one of methods for configuring CSI-IM interworking with aperiodic CSI triggering.

FIG. 20 illustrates one of methods for configuring CSI-IM interworking with aperiodic CSI triggering.

In FIG. 20, assuming that a triggering timing point of aperiodic CSI is SF # M, SF interworking with aperiodic CSI triggering may be SF # M or SF # (M−k). At this time, CSI-IM interworking with aperiodic CSI triggering means that CSI-IM is configured at SF # M or SF # (M−k) prior to k SF if aperiodic CSI is triggered at the same SF # M through a PDCCH. The value of k is a value previously set through a higher layer signal or physical control/data channel between the eNB and the UE.

The UE is characterized to perform interference averaging for only SF interworking with aperiodic CSI triggering, and may perform interference measurement through other physical signal (for example, cell-specific reference signal, UE-specific reference signal, CSI-RS, etc.) in addition to CSI-IM of the corresponding SF.

4.3.5 RRM Measurement and Report

The UE may perform radio resource management (RRM) measurement for the Scell and report the RRM measurement value to the eNB.

For example, the RRM measurement value may be a reference signal received quality (RSRQ) value within the TxOP duration or the interference averaging value described in the sections 4.3.1 to 4.3.4. Alternatively, the RRM measurement value may be a new metric value not the RSRQ value or the interference averaging value. For example, there is {RSRP}/{Average interference} value as an average interference value for taking an average within the TxOP duration only. The RSRP value is a received power value of a reference signal transmitted from the eNB, and corresponds to a cell power value.

If the eNB which has received the RRM measurement value determines that interference of a specific UE is serious on the TxOP duration, the eNB may not try data transmission to the corresponding UE through the Scell. At this time, whether interference is serious or not may be determined by {RRM measurement value}>{previously defined (or signaled) threshold value}.

4.3.6 Extensive Application at CSI-RS Resource

The aforementioned embodiments of the present invention may equally be applied to even a case that CSI-RS resource is configured as well as a case that CSI-IM resource is configured.

4.4 Method for Measuring Interference Using CSI-IM and Averaging Interference Hereinafter, methods for performing IM in a UE by using CSI-IM, measuring CSI by using IM, and reporting the measured CSI to an eNB will be described based on the aforementioned embodiments of the present invention.

Figure 21:
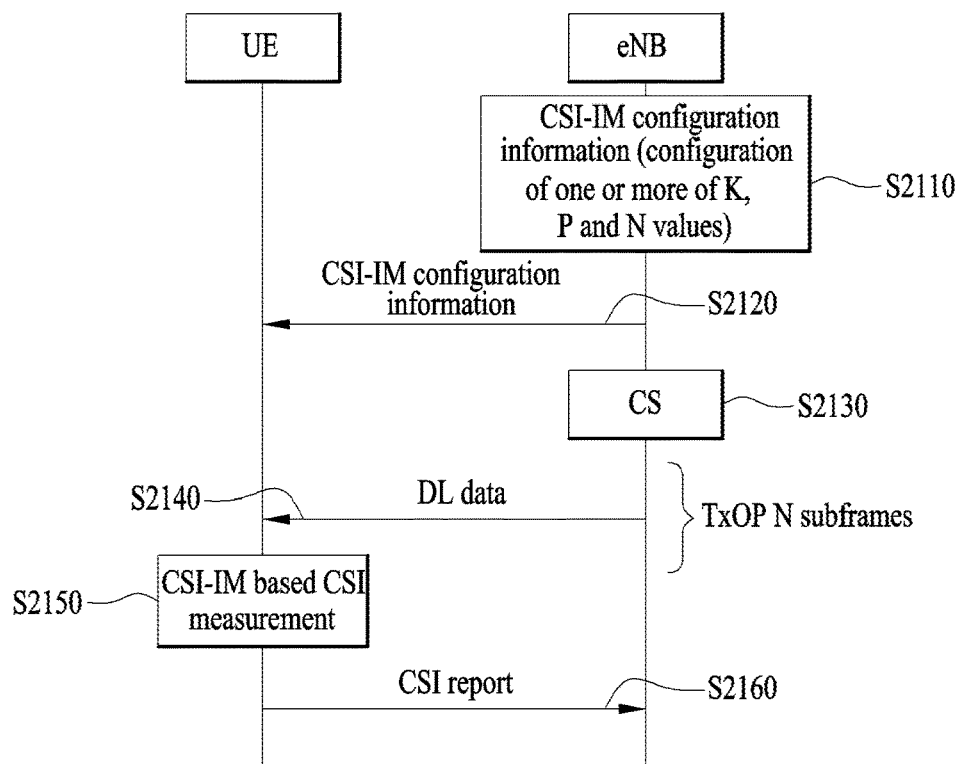
FIG. 21 illustrates one of methods for configuring CSI-IM in an eNB and reporting CSI from a UE by using the configured CSI-IM.

FIG. 21 illustrates one of methods for configuring CSI-IM in an eNB and reporting CSI from a UE by using the configured CSI-IM.

The eNB may configure CSI-IM configuration information. The CSI-IM configuration information may include one or more of a configuration period value 'P' of the CSI-IM resource, a period value 'K' of the TxOP duration, and a size 'N' of the TxOP duration (S2110).

The eNB may transmit the CSI-IM configuration information to the UE semi-statically by using a higher layer signal (e.g., RRC or MAC signal) through the Pcell. That is, the UE may use the CSI-IM resource in accordance with the CSI-IM configuration information for the TxOP duration (S2120).

Afterwards, if DL data should be transmitted through the Scell, the eNB may perform a carrier sensing (CS) procedure to determine whether a current channel state is a busy state or an idle state (S2130).

If the channel state is an idle state, the eNB may transmit DL data for the TxOP duration comprised of 'N' number of subframes through the Scell (S2140).

The UE may measure CSI by using the CSI-IM configuration information received at the step S2120. For example, the UE may identify SFs at which the CSI-IM resource is configured, based on the CSI-IM configuration information, and may measure interference on the TxOP duration at the corresponding SFs on the basis of the CSI-IM resource. Also, the UE may measure CSI on the TxOP duration based on the measured interference and DL data and/or reference signals transmitted for the TxOP duration (S2150).

The UE may report the measured CSI to the eNB periodically or aperiodically. The periodic or aperiodic CSI report method may be performed based on the methods described in the section 2.6 (S2160).

In another aspect of the present invention, at the step S2120, the eNB may transmit the CSI-IM configuration information to the UE dynamically through a physical layer signal (for example, PDCCH or PDSCH). In this case, if the TxOP duration is configured aperiodically in the Scell of the unlicensed band, the CSI-IM resource may be configured more adaptively although signaling overhead may be more increased than the case that the CSI-IM configuration information is transmitted semi-statically.

The embodiment described in FIG. 21 may be applied to the methods described in the aforementioned sections 4.1 and 4.2. For example, the sections 4.2.1 to 4.2.3 may be applied to the method for configuring CSI-IM configuration information in the eNB.

Figure 22:
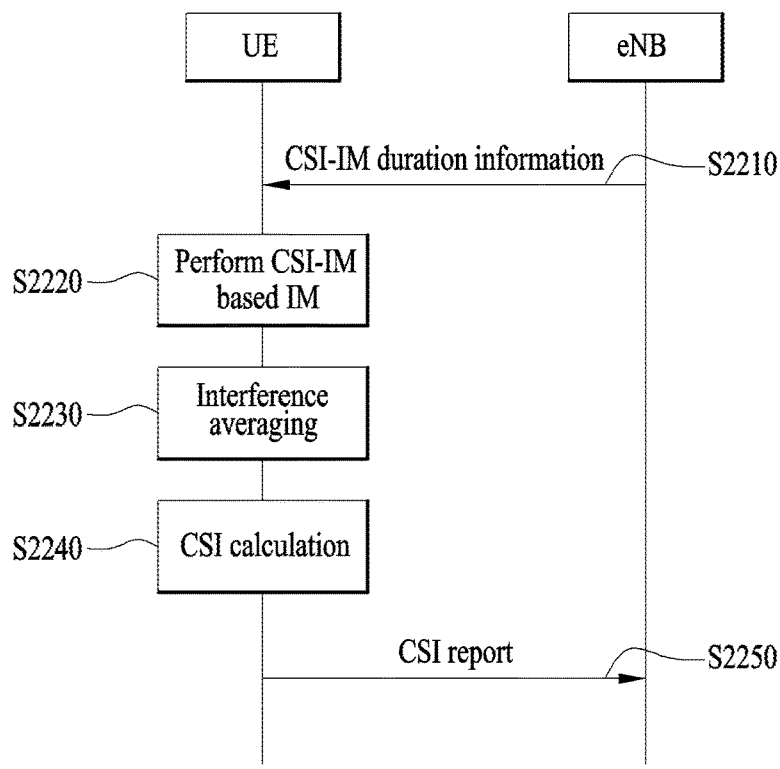
FIG. 22 illustrates a method for calculating CSI by means of a UE on the basis of CSI-IM duration information.

FIG. 22 illustrates a method for calculating CSI by means of a UE on the basis of CSI-IM duration information. FIG. 22 is provided to describe the step S2150 in more detail.

The eNB may transmit CSI-IM duration information to the UE by using a higher layer signal (for example, RRC or MAC signal) or a physical layer channel to configure CSI-IM (S2210).

The UE performs interference measurement by using CSI-IM corresponding to the TxOP duration on the basis of the CSI-IM duration information (S2220).

Also, the UE may perform interference averaging to prevent distortion of interference due to a hidden node problem from occurring. At this time, the methods for averaging interference as described in the sections 4.3.1 to 4.3.4 based on the interference measured at the step S2220 may be used as the method for averaging interference (S2230).

The UE may calculate CSI on the TxOP duration based on the measured interference value, received DL data and CSI-RS and report the calculated CSI to the eNB (S2240, S2250).

5. Apparatus

Figure 23:
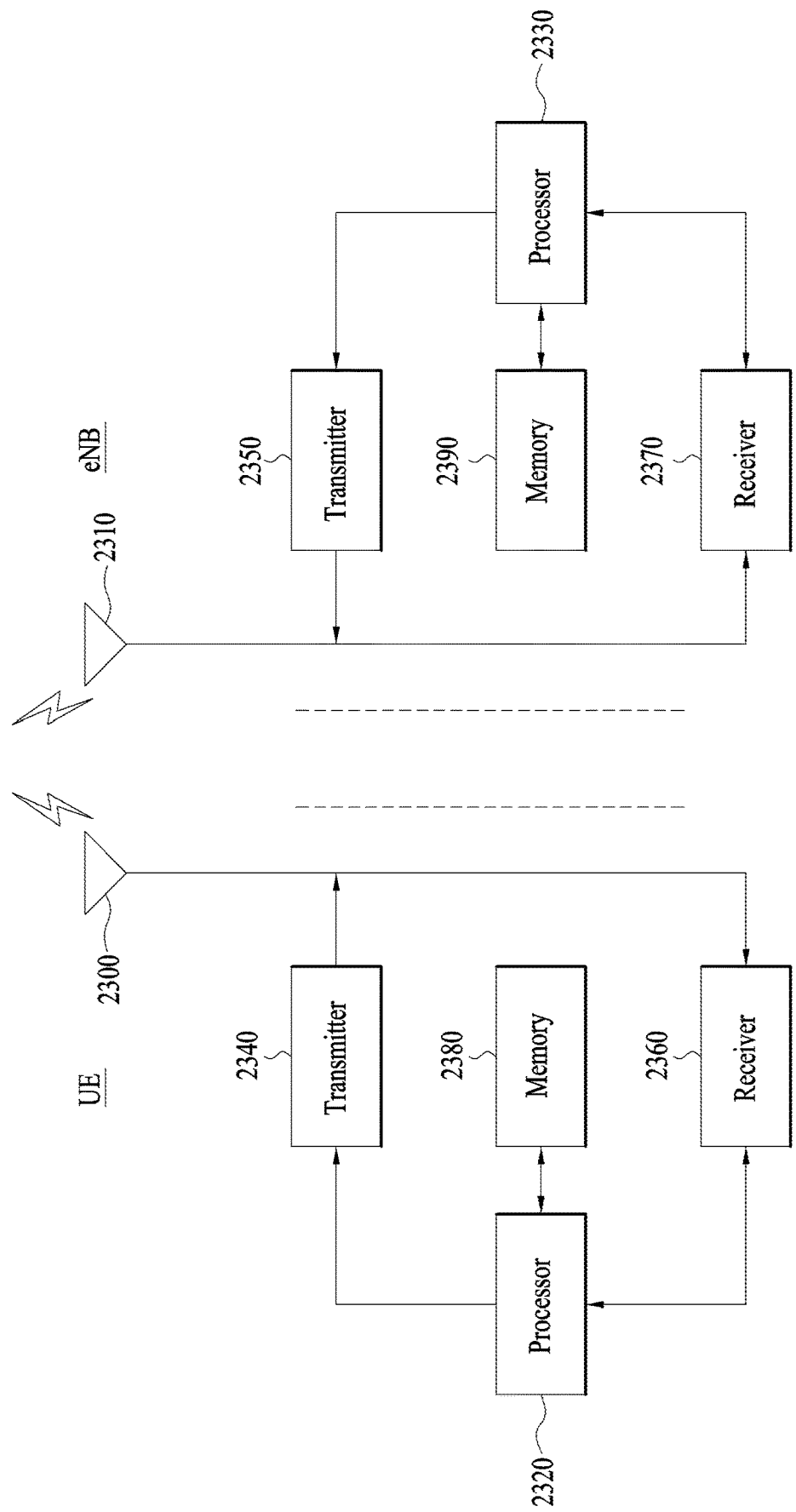
FIG. 23 illustrates a device through which methods described in FIGS. 1 to 22 can be implemented.

Apparatuses illustrated in FIG. 23 are means that can implement the methods described before with reference to FIGS. 1 to 22.

A UE may act as a transmitter on a UL and as a receiver on a DL. An eNB may act as a receiver on a UL and as a transmitter on a DL.

That is, each of the UE and the eNB may include a transmitter 2340 or 2350 and a receiver 2360 or 2370, for controlling transmission and reception of information, data, and/or messages, and an antenna 2300 or 2310 for transmitting and receiving information, data, and/or messages.

Each of the UE and the eNB may further include a processor 2320 or 2330 for implementing the afore-described embodiments of the present disclosure and a memory 2380 or 2390 for temporarily or permanently storing operations of the processor 2320 or 2330.

The embodiments of the present invention may be performed using the aforementioned components and functions of the UE and eNB. For example, the processor of the eNB may configure a TxOP duration and transmit configuration information on the TxOP duration to the UE by combination of the methods disclosed in the aforementioned sections 1 to 4. Also, the processor of the eNB may control the transmitter and receiver to support the operation of the TxOP duration. The processor of the UE may support the operation of the TxOP duration on the basis of the configuration information on the TxOP duration, which is received from the eNB. At this time, the processor of the UE may support the TxOP operation by controlling the transmitter and the receiver. The detailed operation will be understood with reference to the section 3 and the section 4.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MINI terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2380 or 2390 and executed by the processor 2320 or 2330. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for transmitting channel state information (CSI) on a transmission opportunity (TxOP) duration by a user equipment (UE) in a wireless communication system supporting an unlicensed band, the method comprising:
measuring CSI of the TxOP duration based on a CSI interference measurement (CSI-IM) and/or a CSI reference signal (CSI-RS) in one or more time intervals via the unlicensed band,
wherein the one or more time intervals are determined based on a starting point of the TxOP duration; and
transmitting the CSI to a base station,
wherein a size of the TxOP duration and a period for configuring the TxOP duration are configured based on period information of the CSI-IM,
wherein CSI-IM configuration information comprising period information P of the CSI-IM, period information K of the TxOP duration, and size information N of the TxOP duration is received from the base station, and
wherein the one or more time intervals are one or more subframes starting from a subframe determined based on the starting point of the TxOP duration and a subframe offset value, with having a certain periodicity.

2. The method of claim 1, wherein information on the starting point of the TxOP duration and the subframe offset value are received via a higher layer signaling or physical channel.

3. The method of claim 1,
wherein information on the starting point of the TxOP duration and the subframe offset value are received via a licensed band, and
wherein the licensed band and the unlicensed band are operated in a manner of carrier aggregation.

4. The method of claim 1, wherein the UE receives TxOP information on a size of the TxOP duration.

5. The method of claim 4, wherein the TxOP information is received via a higher layer signaling or physical channel.

6. The method of claim 1, further comprising:
receiving downlink control information (DCI) including scheduling information on the TxOP duration; and
receiving downlink data within the TxOP duration scheduled by the DCI.

7. The method of claim 1, further comprising:
performing radio resource management (RRM) for the TxOP duration; and
transmitting a RRM value to the base station,
wherein the RRM value is measured based on an average interference value for taking an average within the TxOP duration and a reference signal received power value.

8. A method for receiving channel state information (CSI) on a transmission opportunity (TxOP) duration by a base station in a wireless communication system supporting an unlicensed band, the method comprising:
performing carrier sensing on the unlicensed band to check a channel state of the unlicensed band;
when the channel state of the unlicensed band is determined as an idle state, transmitting downlink signals within the TxOP duration; and
receiving the CSI of the TxOP duration from a user equipment,
wherein the CSI is measured based on a CSI interference measurement (CSI-IM) and/or a CSI reference signal (CSI-RS) in one or more time intervals via the unlicensed band,
wherein the one or more time intervals are determined based on a starting point of the TxOP duration,
wherein a size of the TxOP duration and a period for configuring the TxOP duration are configured based on period information of the CSI-IM,
wherein CSI-IM configuration information comprising period information P of the CSI-IM, period information K of the TxOP duration, and size information N of the TxOP duration is transmitted by the base station, and
wherein the one or more time intervals are one or more subframes starting from a subframe determined based on the starting point of the TxOP duration and a subframe offset value, with having a certain periodicity.

9. A user equipment (UE) for transmitting channel state information (CSI) on a transmission opportunity (TxOP) duration in a wireless communication system supporting an unlicensed band, the UE comprising:
a transmitter;
a receiver; and
a processor for controlling the transmitter and the receiver to transmit the CSI on the TxOP duration, wherein the processor is configured to:
measure CSI of the TxOP duration based on a CSI interference measurement (CSI-IM) and/or a CSI reference signal (CSI-RS) in one or more time intervals via the unlicensed band,
wherein the one or more time intervals are determined based on a starting point of the TxOP duration; and
transmit the CSI to a base station,
wherein a size of the TxOP duration and a period for configuring the TxOP duration are configured based on period information of the CSI-IM,
wherein CSI-IM configuration information comprising period information P of the CSI-IM, period information K of the TxOP duration, and size information N of the TxOP duration is received from the base station, and
wherein the one or more time intervals are one or more subframes starting from a subframe determined based on the starting point of the TxOP duration and a subframe offset value, with having a certain periodicity.

10. The UE of claim 9, wherein information on the starting point of the TxOP duration and the subframe offset value are received via a higher layer signaling or physical channel.

11. The UE of claim 9, wherein information on the starting point of the TxOP duration and the subframe offset value are received via a licensed band, and wherein the licensed band and the unlicensed band are operated in a manner of carrier aggregation.

12. The UE of claim 9, wherein the processor controls the receiver to receive TxOP information on a size of the TxOP duration.

13. The UE of claim 12, wherein the TxOP information is received via a higher layer signaling or physical channel.

14. The UE of claim 9, wherein the processor is further configured to control the receiver to:
receive downlink control information (DCI) including scheduling information on the TxOP duration; and
receive downlink data within the TxOP duration scheduled by the DCI.

15. The UE of claim 9, wherein the processor is further configured to:
perform radio resource management (RRM) for the TxOP duration; and
transmit a RRM value to the base station,
wherein the RRM value is measured based on an average interference value for taking an average within the TxOP duration and a reference signal received power value.

* * * * *